United States Patent
Abido et al.

(10) Patent No.: US 9,847,645 B2
(45) Date of Patent: Dec. 19, 2017

(54) NEURO-FUZZY CONTROL SYSTEM FOR GRID-CONNECTED PHOTOVOLTAIC SYSTEMS

(71) Applicant: KING FAHD UNIVERSITY OF PETROLEUM AND MINERALS, Dhahran (SA)

(72) Inventors: Mohammad Ali Abido, Dhahran (SA); Muhammed Y. Worku, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 521 days.

(21) Appl. No.: 14/613,302

(22) Filed: Feb. 3, 2015

(65) Prior Publication Data

US 2016/0226253 A1 Aug. 4, 2016

(51) Int. Cl.
*H02J 3/38* (2006.01)

(52) U.S. Cl.
CPC ............. *H02J 3/383* (2013.01); *Y02E 10/563* (2013.01); *Y02E 10/58* (2013.01)

(58) Field of Classification Search
CPC ...................................................... H02J 3/383
USPC .......................................................... 307/31
See application file for complete search history.

(56) References Cited

U.S. PATENT DOCUMENTS

2012/0038217 A1* 2/2012 Egiziano .................. G05F 1/67
307/82

FOREIGN PATENT DOCUMENTS

KR 10-0886891 3/2009
KR 10-2013-0068560 6/2013

OTHER PUBLICATIONS

Abu-Rub et al., "Adaptive neuro-fuzzy inference system-based maximum power point tracking of solar PV modules for fast varying solar radiations," International Journal of Sustainable Energy, Jan. 2011.
Aldobhani et al., "Maximum Power Point Tracking of PV System Using ANFIS Prediction and Fuzzy Logic Tracking," *Proceedings of the International MultiConference of Engineers and Computer Scientists*, vol. II, Mar. 19-21, 2008.
Kharb et al., "Improved Maximum Power Point Tracking for Solar PV Module using ANFIS," International Journal of Current Engineering and Technology, vol. 3, No. 5 (Dec. 2013).

* cited by examiner

*Primary Examiner* — Joseph Chang
(74) *Attorney, Agent, or Firm* — Richard C. Litman

(57) ABSTRACT

The neuro-fuzzy control system for a grid-connected photovoltaic (PV) system includes an Adaptive Neuro-Fuzzy Inference System (ANFIS) implemented in real time. Independent active and reactive P-Q power control transfers the generated power to the grid using a voltage source inverter (VSI). The PV system includes a PV module, a buck converter, a VSI, a maximum power point tracking (MPPT) controller for the buck converter, and a VSI controller. The MPPT controller uses irradiation and temperature as inputs. A five-layer ANFIS processes these inputs and provides a control reference voltage as input to a PI controller connected to the buck converter to maintain the output voltage of the photovoltaic array with respect to the control reference voltage.

12 Claims, 31 Drawing Sheets

NEURO-FUZZY CONTROL SYSTEM FOR GRID-CONNECTED PHOTOVOLTAIC SYSTEMS

BACKGROUND OF THE INVENTION

1. Field of the Invention

The present invention relates to photovoltaic power generation systems, and particularly to a neuro-fuzzy control system for a grid connected photovoltaic (PV) system.

2. Description of the Related Art

As a result of increasing environmental concern, price volatility and carbon impact of fossil fuels, the development of renewable energy based Distributed Generation (DG) is moving fast to meet the worldwide urgent needs of utilizing clean energy sources and minimizing costs. Solar energy is among the promising renewable energy sources, and photovoltaic (PV) systems provide the most direct method to convert solar energy into electrical energy without environmental contamination. The converted electrical power produced by a PV system can be injected to the grid if it meets the grid code. In order to do so, controlling the power electronics blocks that are used for grid integration is vital in order to get the maximum output of the solar energy.

Thus, a neuro-fuzzy control system for grid-connected photovoltaic systems solving the aforementioned problems is desired.

SUMMARY OF THE INVENTION

The neuro-fuzzy control system for a grid-connected photovoltaic (PV) system includes an Adaptive Neuro-Fuzzy Inference System (ANFIS) implemented in real time. Independent active and reactive (P-Q) power control transfers the generated power to the grid using a voltage source inverter (VSI). The PV system includes a PV module, a buck converter, a VSI, a maximum power point tracking (MPPT) controller for the buck converter, and a VSI controller. The MPPT controller uses irradiation and temperature as inputs. A five layer ANFIS processes these inputs and provides a control reference voltage as input to a PI (proportional-integral) controller connected to the buck converter to maintain the output voltage of the photovoltaic array with respect to the control reference voltage.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 5:
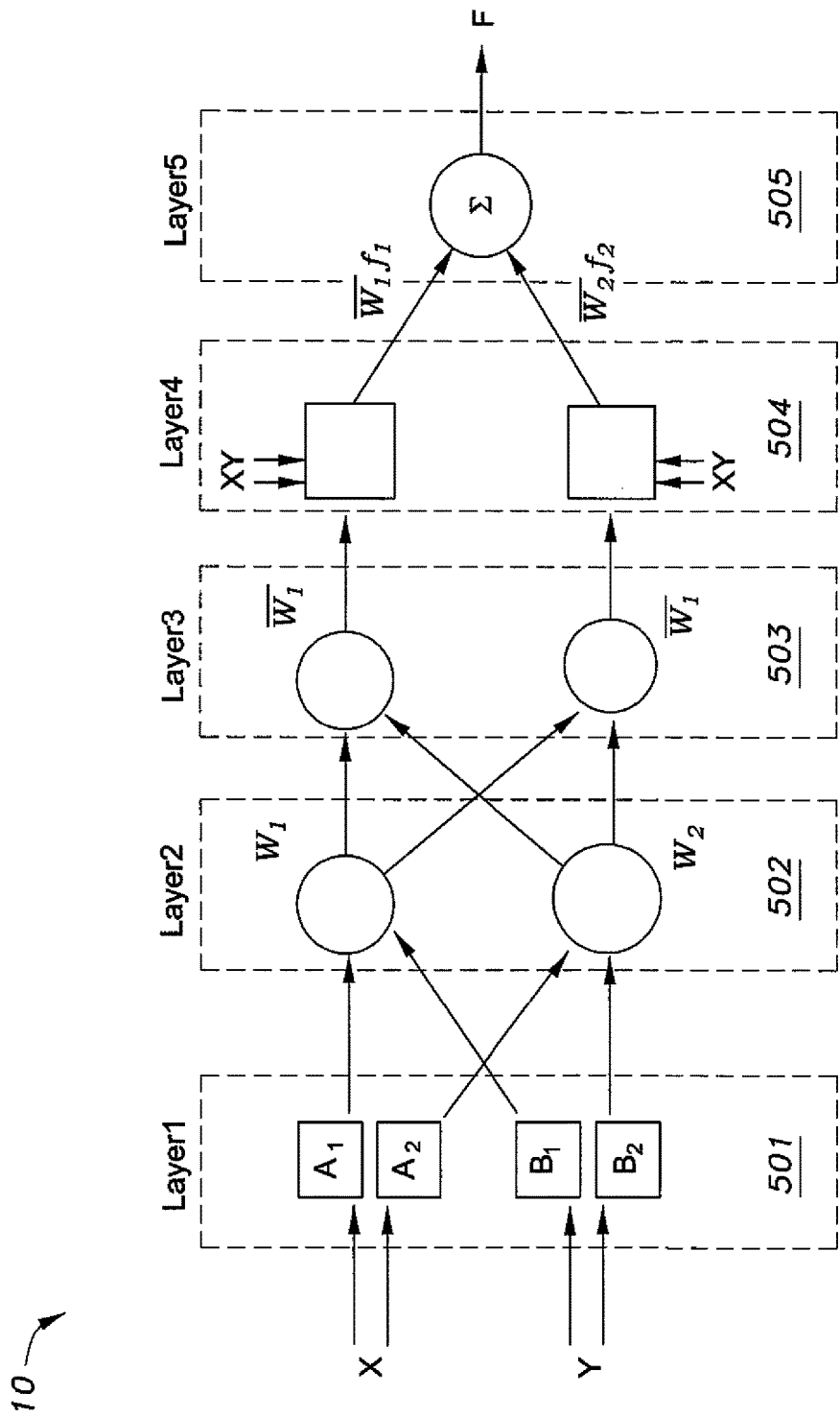
FIG. 5 is a block diagram showing details of the ANFIS controller in a neuro-fuzzy control system for a grid-connected photovoltaic (PV) system according to the present invention.
Figure 31:
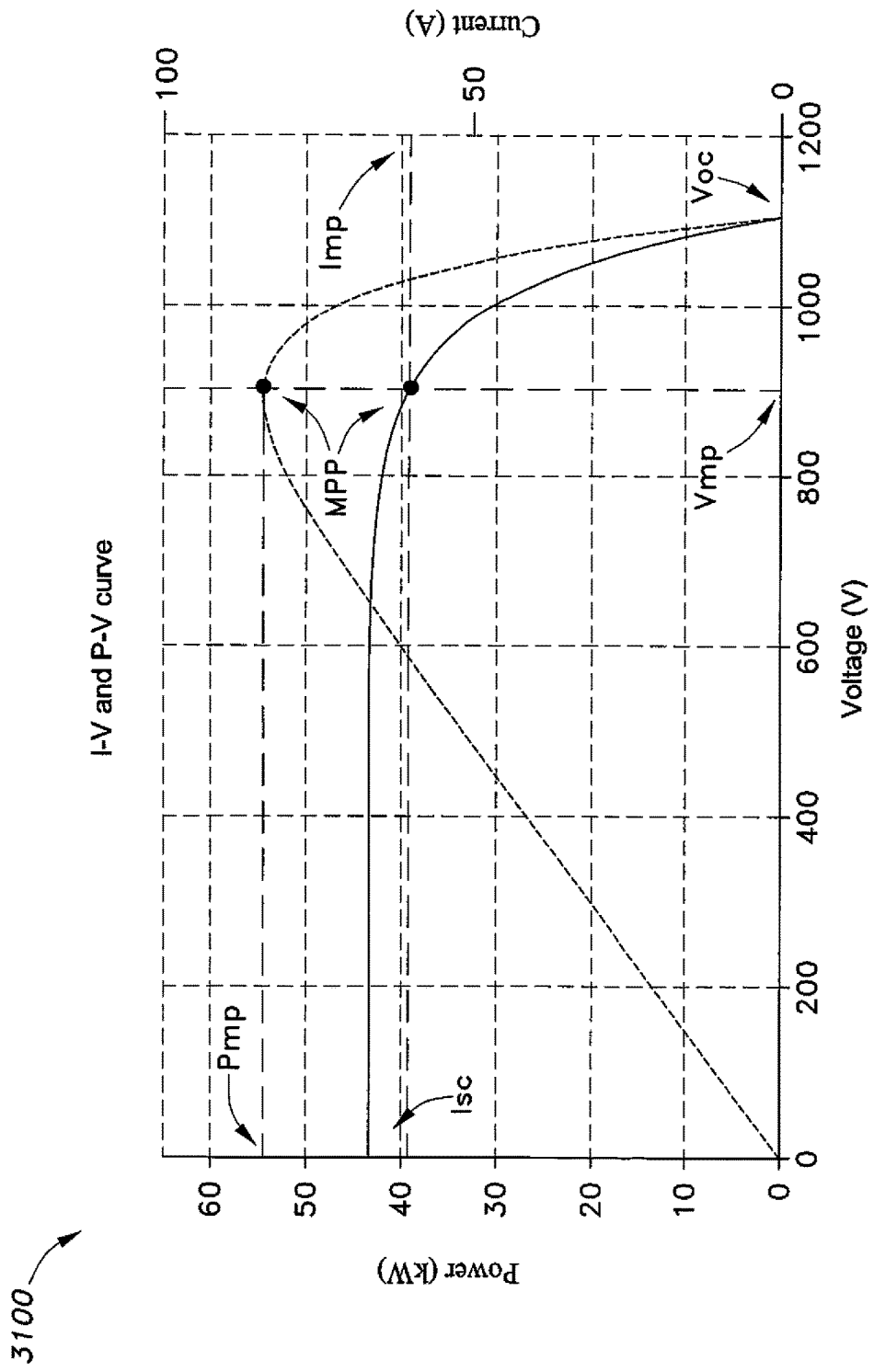
FIG. 31 is a plot showing maximum power point for a PV array in a neuro-fuzzy control system for a grid-connected photovoltaic (PV) system according to the present invention.

The neuro-fuzzy control system for a grid-connected photovoltaic (PV) system includes an Adaptive Neuro-Fuzzy Inference System (ANFIS) controller 10 implemented in real time. Independent active and reactive P-Q power control transfers the generated power to the grid using a voltage source inverter (VSI). The ANFIS controller 10 keeps the DC link voltage $V_{DC}$ constant for real power delivery. Depending on the change in irradiation and temperature, the generated power is transferred to the grid by the P-Q controller 800. The PV system 400 is configured as a two-stage topology that includes a PV module 16, a buck converter 18, a VSI, ANFIS maximum power point tracking (MPPT) controller 10 for the buck converter 18, and a VSI controller 800. The ANFIS MPPT controller 10 uses irradiation and temperature as inputs. As shown in FIG. 5, the ANFIS MPPT controller 10 utilizes five neuro layers (input layer 501, hidden layers 502 and 503, rules layer 504 and firing [defuzzification] layer 505) to process these inputs and provide a control reference voltage as input to a PI (proportional-integral) controller 14 connected to the buck converter 18 to maintain the output voltage of the photovoltaic array 16 with respect to the control reference voltage $V_{ref}$. The negative of voltage $V_{PV}$ from PV array 16 is added to reference voltage output $V_{ref}$ of the ANFIS controller 10 by summation unit 12. The output of the summation unit 12, i.e., ($V_{ref}-V_{PV}$) is input to the PI controller 14. The output performs duty cycle control on the buck converter 18. Unlike conventional fuzzy controllers, the present controller 10 is adaptive in nature due to error back propagation, which adjusts weights $W_1$ and $W_2$ and does not require expert knowledge for its implementation. Additionally, the least square error (LSE) method is used in conjunction with the back propagation to facilitate the training of the adaptive neuro-fuzzy MPPT controller 10. A trained MPPT controller 10 will successfully allocate the maximum power point (MPP) of the PV array under varying operating conditions. A maximum power point for a PV array is shown in plot 3100 of FIG. 31.

Inputs of the present adaptive neuro-fuzzy MPPT controller 10 are the ambient condition (i.e. solar radiation and temperature), and its output control signal is reference voltage $V_{ref}$, which provides input to the voltage control loop. The voltage control loop comprises a proportional integral controller 14, which is used to maintain the output voltage of the photovoltaic array 16 to the reference voltage by adjusting the duty cycle of the DC-DC converter 18. Operating temperature is varied from 0° C. to 80° C., and the solar irradiance level is varied from 0 W/m$^2$ to 2000 W/m$^2$ to get the training data sets for the ANFIS MPPT controller 10. One thousand training data sets were selected randomly, and 300 epochs were used to train the ANFIS MPPT controller 10.

Figure 1:
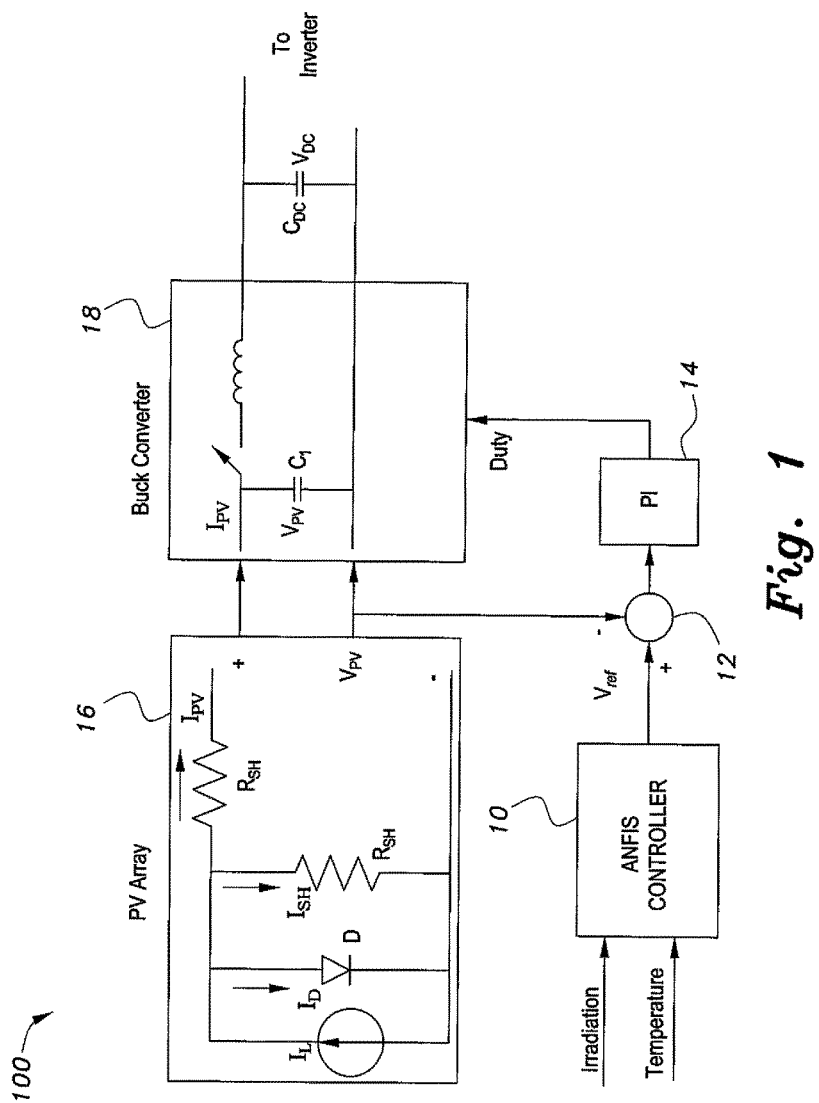
FIG. 1 is a block diagram of the ANFIS-based MPPT and DC-DC converter controller in a neuro-fuzzy control system for a grid-connected photovoltaic (PV) system according to the present invention.
Figure 4:
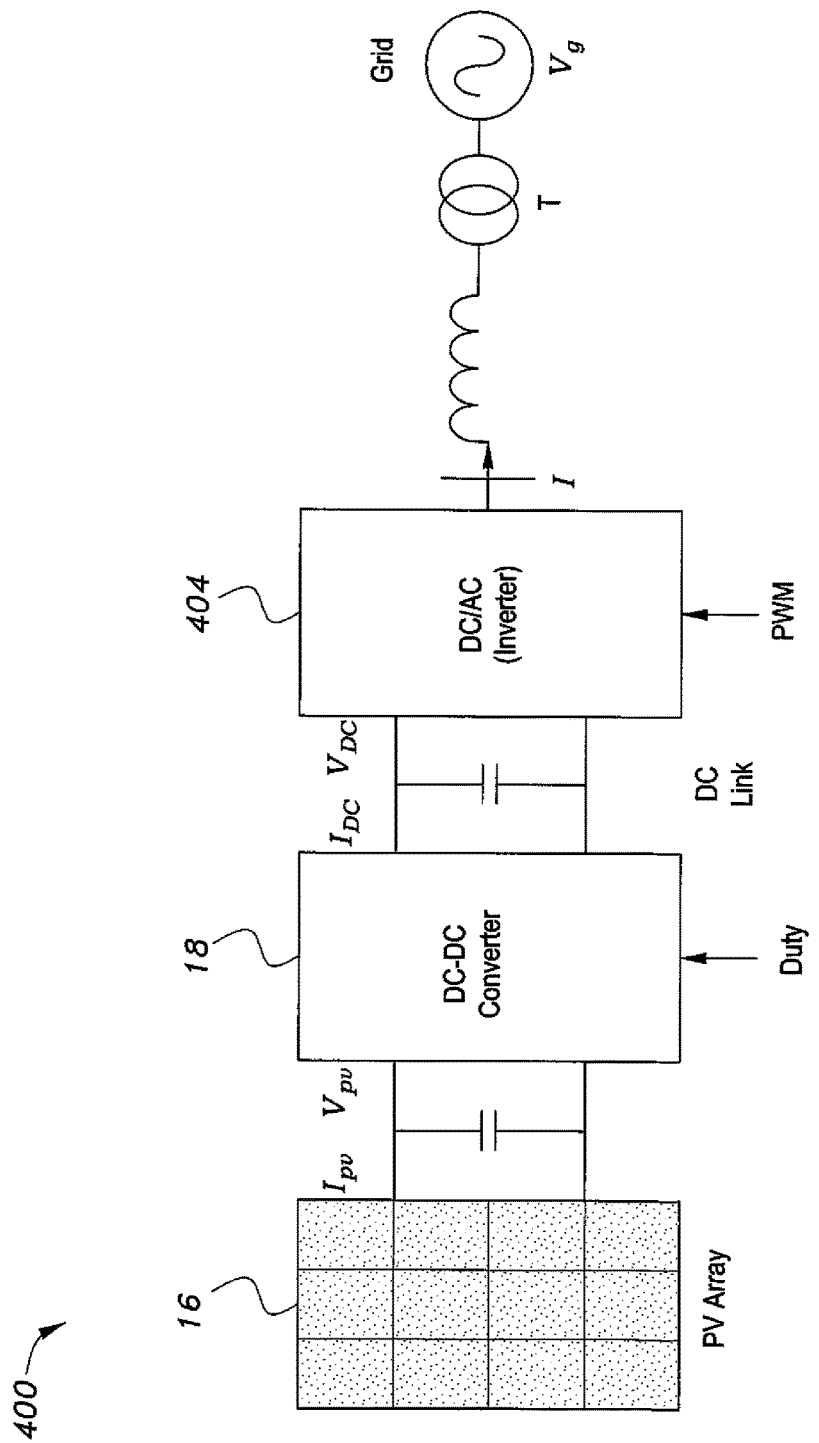
FIG. 4 is a Nock diagram of a grid connected PV system in a neuro-fuzzy control system for a grid-connected photovoltaic (PV) system according to the present invention.

As shown in FIG. 1, the direct current (DC) electronics 100 comprises a PV array 16 and a DC-DC buck converter 18. As shown in FIG. 4, the DC-DC buck converter power electronic block 18 and the VSI DC/AC inverting power electronic block 404 are used to integrate the PV system 400 to the grid, and hence the system utilizes two control blocks. The first control block 10 (shown in FIG. 1) uses ANFIS in conjunction with a PI controller 14 to control the duty cycle of the DC-DC converter 18 for MPPT. The second control block 800 (shown in FIG. 8) is for the VSI to keep the DC link voltage constant for PWM (pulse width modulation), and it has to control the AC current and reactive power.

Like neural networks, ANFIS has a network structure. Unlike neural networks, ANFIS maps the input-output data set using parameters of fuzzy membership functions. FIG. 5 demonstrates that the controller 10 comprises a simple ANFIS architecture based on the two-rule Sugeno system with two inputs, x and y, and single output, f. Here $A_1$, $A_2$ and $B_1$, $B_2$ are fuzzy input memberships for input x and y, respectively, and are used to fuzzify the input. A two rule Sugeno ANFIS has rules of the form:

$$\text{If } x \text{ is } A_1 \text{ and } y \text{ is } B_1 \text{ THEN } f_1 = p_1 x + q_1 y + r_1, \quad (1)$$

$$\text{If } x \text{ is } A_2 \text{ and } y \text{ is } B_2 \text{ THEN } f_2 = p_2 x + q_2 y + r_2, \quad (2)$$

Figure 2:
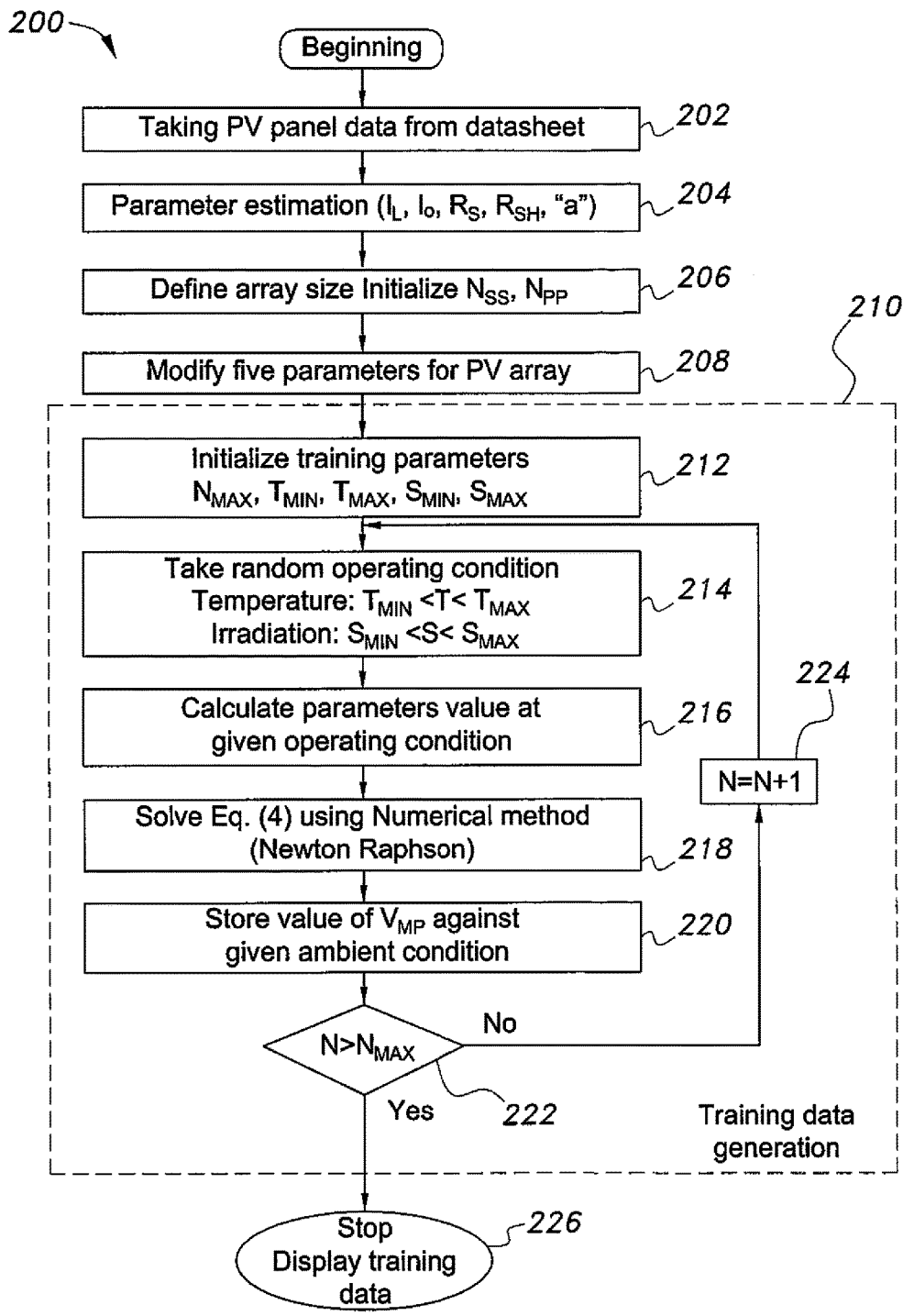
FIG. 2 is a flowchart of the ANFIS training procedure in a neuro-fuzzy control system for a grid-connected photovoltaic (PV) system according to the present invention.
Figure 30:
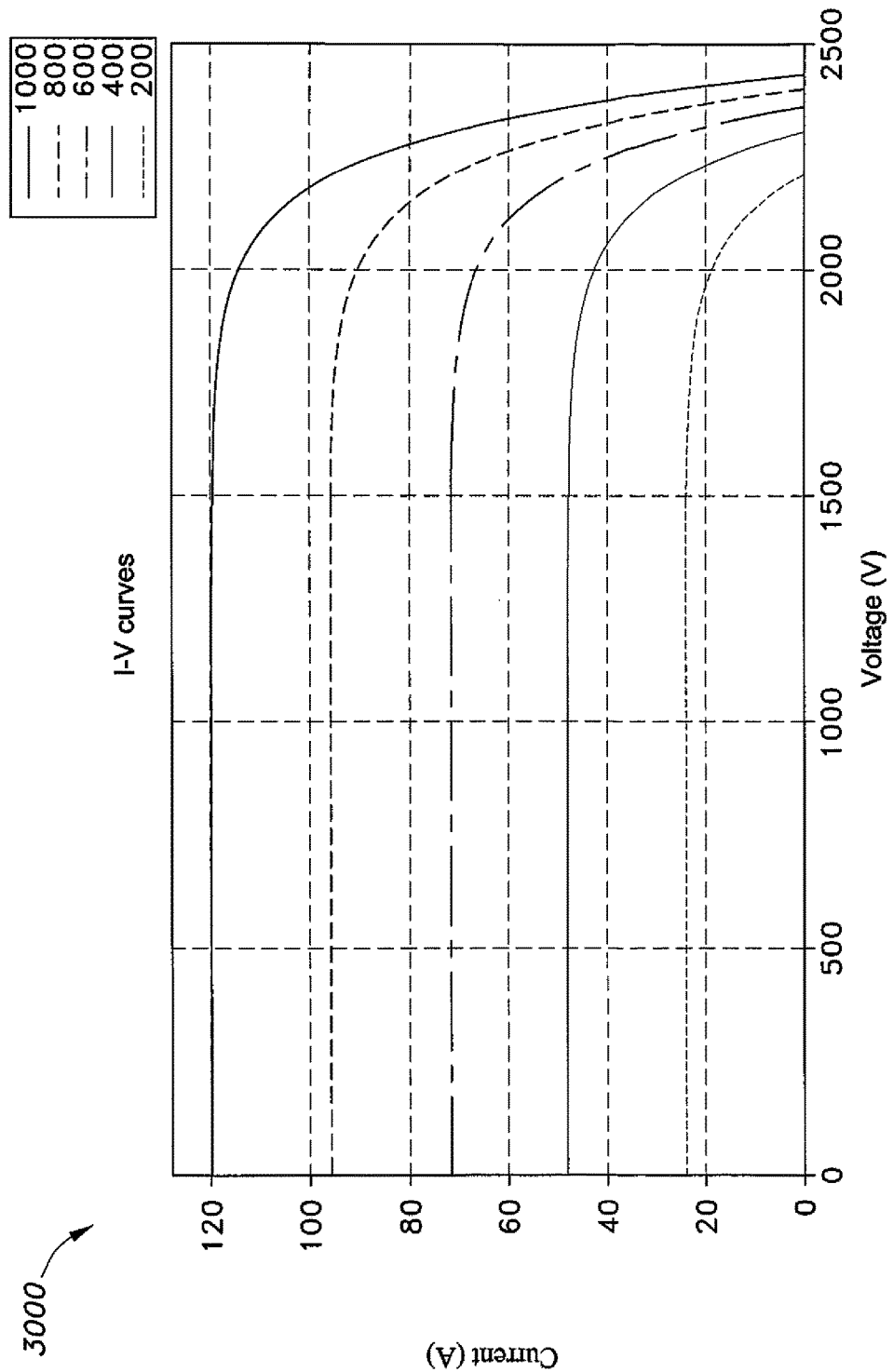
FIG. 30 is a plot showing current voltage characteristics at different irradiation levels in a neuro-fuzzy control system for a grid-connected photovoltaic (PV) system according to the present invention.

Referring to FIG. 2, among the various learning methods, the present adaptive neuro-fuzzy MPPT controller utilizes a hybrid learning method 200 employing back propagation (BP) and least square estimation (LSE) to optimize the premise and consequent parameters. To design a MPPT controller using ANFIS, the first task (labeled as step 202) is to gather the input-output data set for training purposes. This training data is generated using the developed PV model in RSCAD (interface software for the RTDS). A step-by-step process of data generation is illustrated in the flowchart shown in FIG. 2. At step 204, values of the five parameters ($I_L$, the light generated current, $I_0$, the diode saturation current, $R_S$ and $R_{SH}$, the series and parallel resistance, respectively, and a, the diode modified ideality factor) for the considered PV panel and PV array 16 are estimated using an efficient algorithm (Differential Evolution is used). At step 206, an array size is defined initializing $N_{ss}$ (number of series connected panels), and $N_{pp}$ (number of parallel connected panels) using the I-V characteristic of a PV array, shown in plot 3000 of FIG. 30. At step 208, the five parameters of step 204 are modified for the specific PV array defined by $N_{ss}$, $N_{pp}$. Training block 210 includes a loop counter 224 to continue training data generation at additional operating conditions.

Within training block 210, step 212 initializes the training parameters $N_{MAX}$: Number of training data points, $T_{MIN}$: Minimum temperature, $T_{MAX}$: Maximum temperature, $S_{MIN}$: Minimum Irradiation, $S_{MAX}$: Maximum Irradiation. At step 214, a random temperature and irradiation operating condition is selected. At step 216, parameter values are calculated given the operating condition selected in step 214. At step 218, the PV array modeling equation characterized by the relation:

$$I_D = I_L - I_0 \left\{ \exp\left[\frac{V_{PV} + I_{PV}R_S}{a}\right] - 1 \right\} - \frac{V_{PV} + I_{PV}R_S}{R_{SH}} \quad (3)$$

(where $I_{PV}$ and $V_{PV}$ represent the current and voltage generated from the PV panel, $I_L$ is the light generated current, $I_0$ is the diode saturation current, $R_S$ and $R_{SH}$ are the series and parallel resistance respectively, a is the diode modified ideality factor), is solved using a numerical method, such as the Newton Raphson method.

At step 220, the $V_{MP}$ value (corresponding to the reference voltage $V_{ref}$) is stored against the given ambient condition. At step 222, a stopping criterion is checked, and if not yet met, the training data generation repeats via loop counter 224. The training data is displayed at step 226 once the stopping criterion has been met.

Input of the present ANFIS-based MPPT controller 10 comprises the ambient conditions, which are irradiation and temperature. The present ANFIS-based MPPT controller's output is the reference voltage, $V_{ref}$, as shown in FIG. 1. This voltage is compared with the PV array output voltage, and the difference is processed by PI regulator 14. After comparison of a high frequency carrier signal with the output of the PI controller 14, a firing pulse (PWM) is generated for the DC-DC converter 18. The DC link voltage $V_{DC}$ is the Duty multiplied by the PV array output voltage, $V_{PV}$. The DC link capacitor $C_{DC}$ removes the offset of this voltage.

Figure 6:
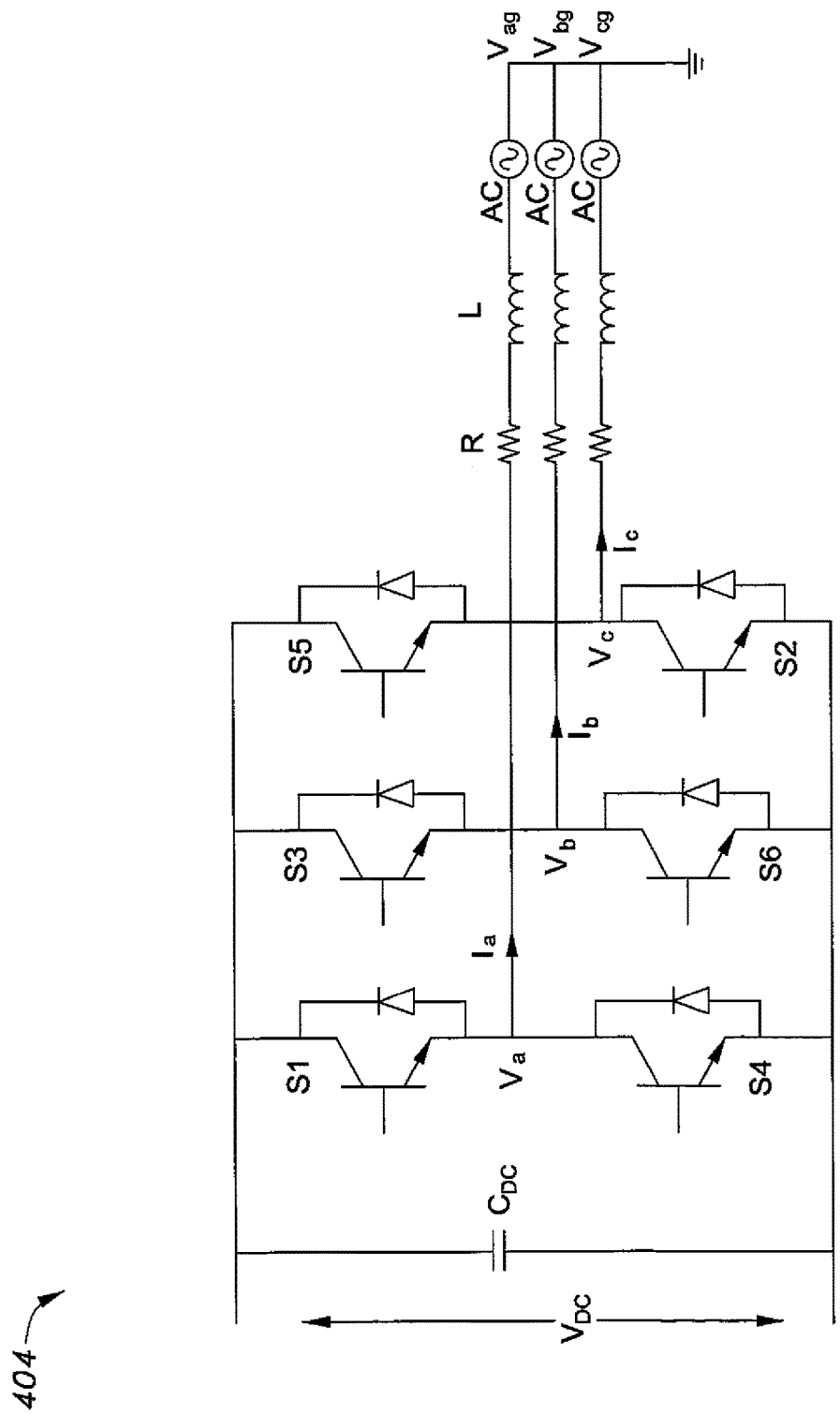
FIG. 6 is a schematic diagram of a two-level three-phase inverter in a neuro-fuzzy control system for a grid-connected photovoltaic (PV) system according to the present invention

The DC power coming from the DC-DC converter has to be converted to three-phase AC power, either to supply AC loads or for grid integration using the two-level three-phase inverter 404, shown in FIG. 6. The first function of the inverter controller 800 (shown in FIG. 8) is to keep the DC voltage constant. Proper control of the magnitude and angle of the inverter output voltage controls the reactive and active power exchanged between the DC link and the grid. The three-phase output voltage equations can be written as:

$$RI_a + L\frac{dI_a}{dt} = V_a - V_{ag} \quad (4)$$

$$RI_b + L\frac{dI_b}{dt} = V_b - V_{bg}$$

$$RI_c + L\frac{dI_c}{dt} = V_c - V_{cg}$$

and $$L\frac{dI_{ab}}{dt} = \frac{1}{3}L\left(\frac{dI_a}{dt} - \frac{dI_b}{dt}\right) \quad (5)$$

where, R and L are resistance and inductance of the distribution line, respectively. $I_a$, $I_b$ and $I_c$ are the distribution line currents; $V_a$, $V_b$, $V_c$ are the inverter output voltages; $V_{ag}$, $V_{bg}$, $V_{cg}$ are the grid voltages. Using a synchronous rotating reference frame (D-Q axis), a decoupled active and reactive current control technique is implemented using a standard PI controller. In the current control technique, the active current component $I_D$ controls the active power, and reactive power flow is regulated by controlling $I_Q$. The PI controllers force these currents to track certain reference commands $I_{DREF}$ and $I_{QREF}$, respectively. The reference input power to the DC link will be the output power from the PV array. Utilizing the instantaneous power theory:

$$P_{dc} = P_g$$

$$P_g = 3/2(V_{LD}I_D + V_{LQ}I_Q)$$

$$Q_g = 3/2 = (V_{LQ}I_D - V_{LD}I_Q) \quad (6)$$

where $P_{dc}$ is the DC link capacitor power and $P_g$ and $Q_g$ are the grid side active and reactive power, respectively. Aligning the phase voltage of the grid to the D-axis reference frame will make $V_{LQ}=0$, so the equation can be further reduced to:

$$P_g = 3/2(V_{LD}I_D)$$

$$Q_g = -3/2 = (V_{LQ}I_Q) \quad (7).$$

Figure 7:
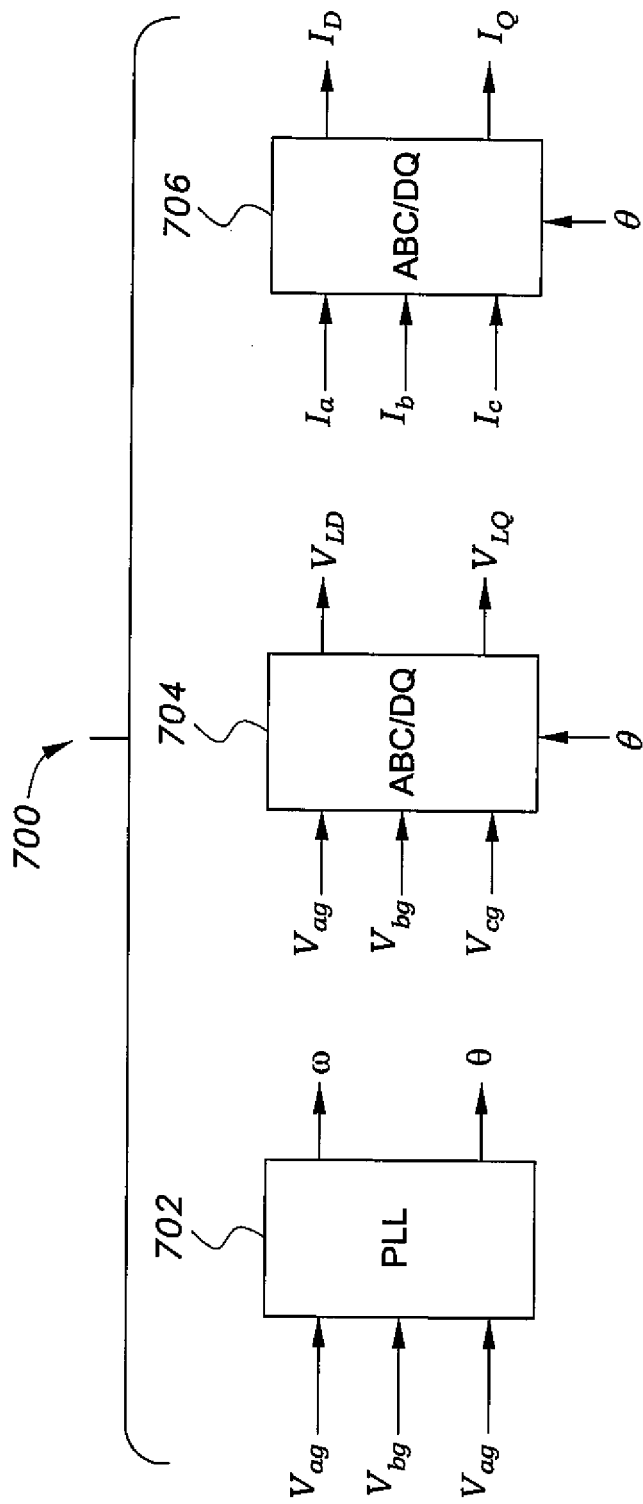
FIG. 7 is a block diagram of a PLL and abc to dq transformation blocks in a neuro-fuzzy control system for a grid-connected photovoltaic (PV) system according to the present invention.
Figure 8:
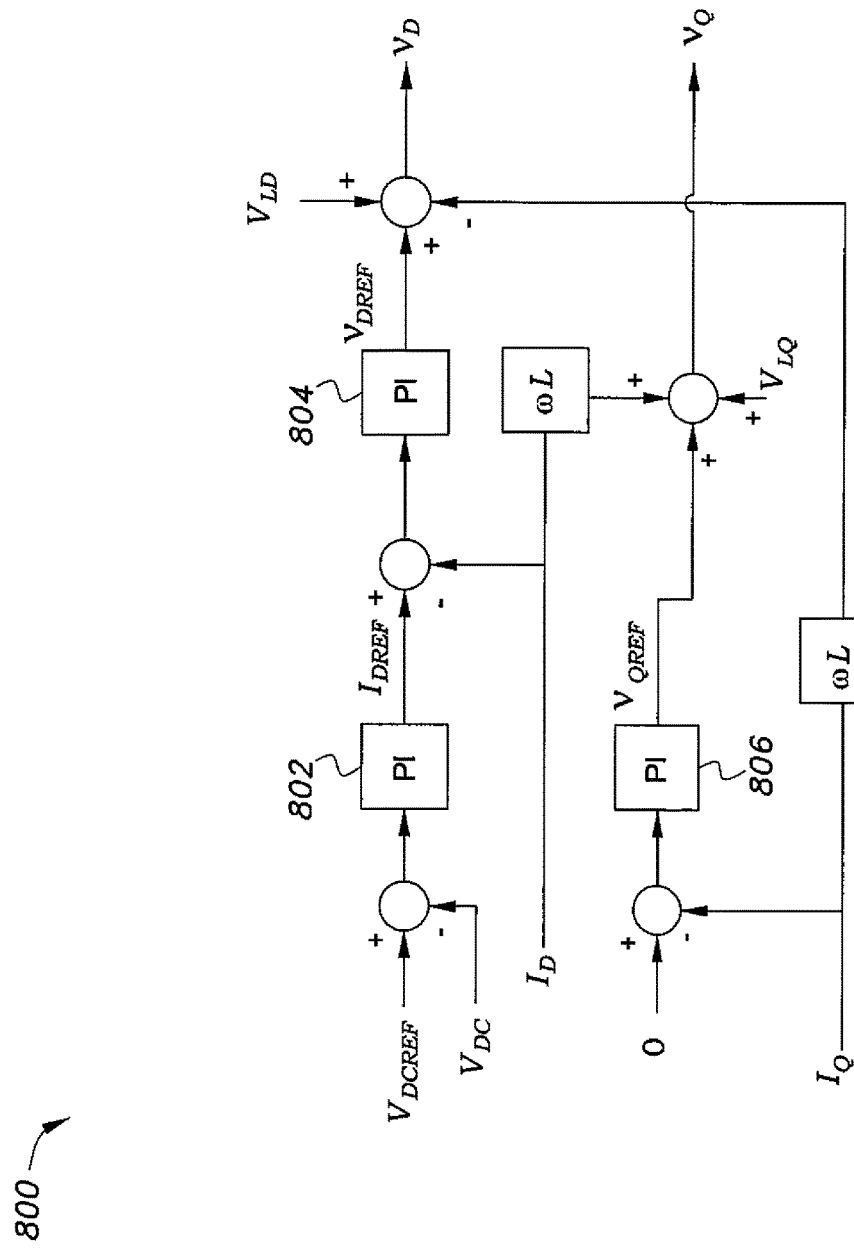
FIG. 8 is a block diagram of decoupled inverter control in a neuro-fuzzy control system for a grid-connected photovoltaic (PV) system according to the present invention.

Phase conversion electronics 700 includes a phase-locked loop (PLL) 702, as shown in FIG. 7, having outputs ω and θ to track the grid frequency ($\omega=2\pi f$) and phase angle θ, respectively. The grid frequency ($\omega=2\pi f$) and phase angle θ are used for the voltage ABC to DQ conversion 704 and the current ABC to DQ conversion 706. As shown in FIG. 8, an inner current PI loop 804 and an outer PI loop 802 are incorporated for the VSI controller. The inner current loop 804 controls the AC current, and the reference current is provided by the outer loop 802. The outer controller 802 includes the DC voltage controller, and for unity power factor operation, $I_{QREF}$ is kept zero. The DC voltage controller maintains the DC link voltage to its reference value, and the reactive power controller 806 regulates the reactive power to its reference value. Since the D and Q components are coupled, a cross-coupling term and a feed forward voltage are used to improve the performance of the PI current controllers, as shown in FIG. 8. The D-axis outer voltage loop controller in the Laplace frame is:

$$I_{DREF} = \left(k_{P1D} + \frac{k_{I1D}}{s}\right) * (V_{DC} - V_{DCREF}). \quad (8)$$

The inner loop current controller is:

$$V_{DREF} = \left(k_{P2D} + \frac{k_{I2D}}{s}\right) * (I_{DREF} - I_D). \quad (9)$$

Similarly, the Q-axis current controller in Laplace frame is given by:

$$V_{QREF} = \left(k_{P2Q} + \frac{k_{I2Q}}{s}\right) * (0 - I_Q), \quad (10)$$

where, $k_{P's}$ are the proportional gains and $k_{I's}$ are the integral gains given in Table 1.

TABLE 1

Values of PI parameters

| Parameter | Value |
|---|---|
| For the inverter | |
| $k_{P1D}$ | 0.7 |
| $K_{I1D}$ | 0.2 |
| $k_{P2D}$ | 0.5 |
| $K_{I2D}$ | 15 |
| $k_{P2Q}$ | 5 |
| $K_{I2Q}$ | 0.5 |
| Coupling inductance L | 1.35 mH |
| DC link capacitor $C_{DC}$ | 80 mF |
| For the DC-DC buck converter(MPPT) | |
| $K_P$ | 0.6 |
| $K_I$ | 0.2 |

Figure 3:
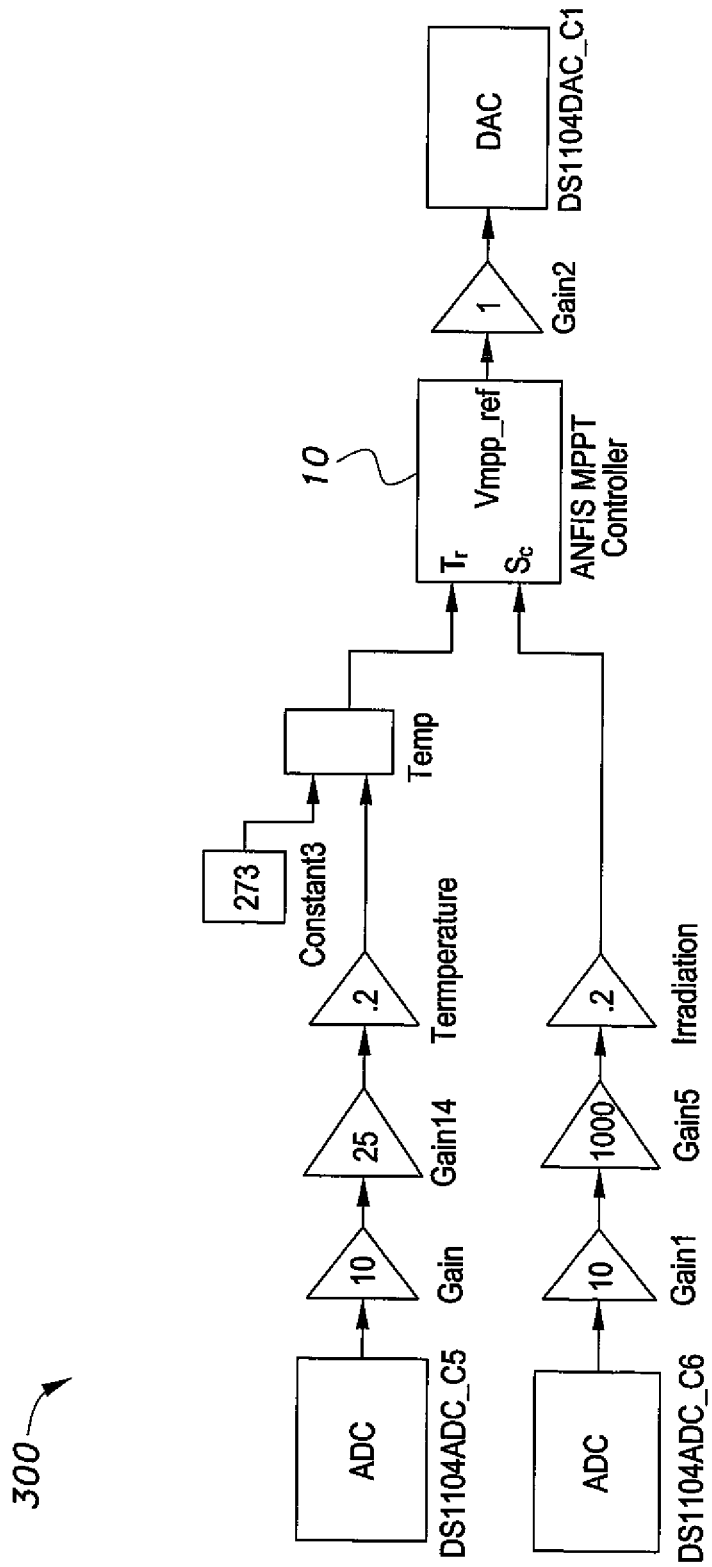
FIG. 3 is a block diagram of a simulator for the ANFIS-based MPPT and DC-DC converter controller in a neuro-fuzzy control system for a grid-connected photovoltaic (PV) system according to the present invention.
Figure 9:
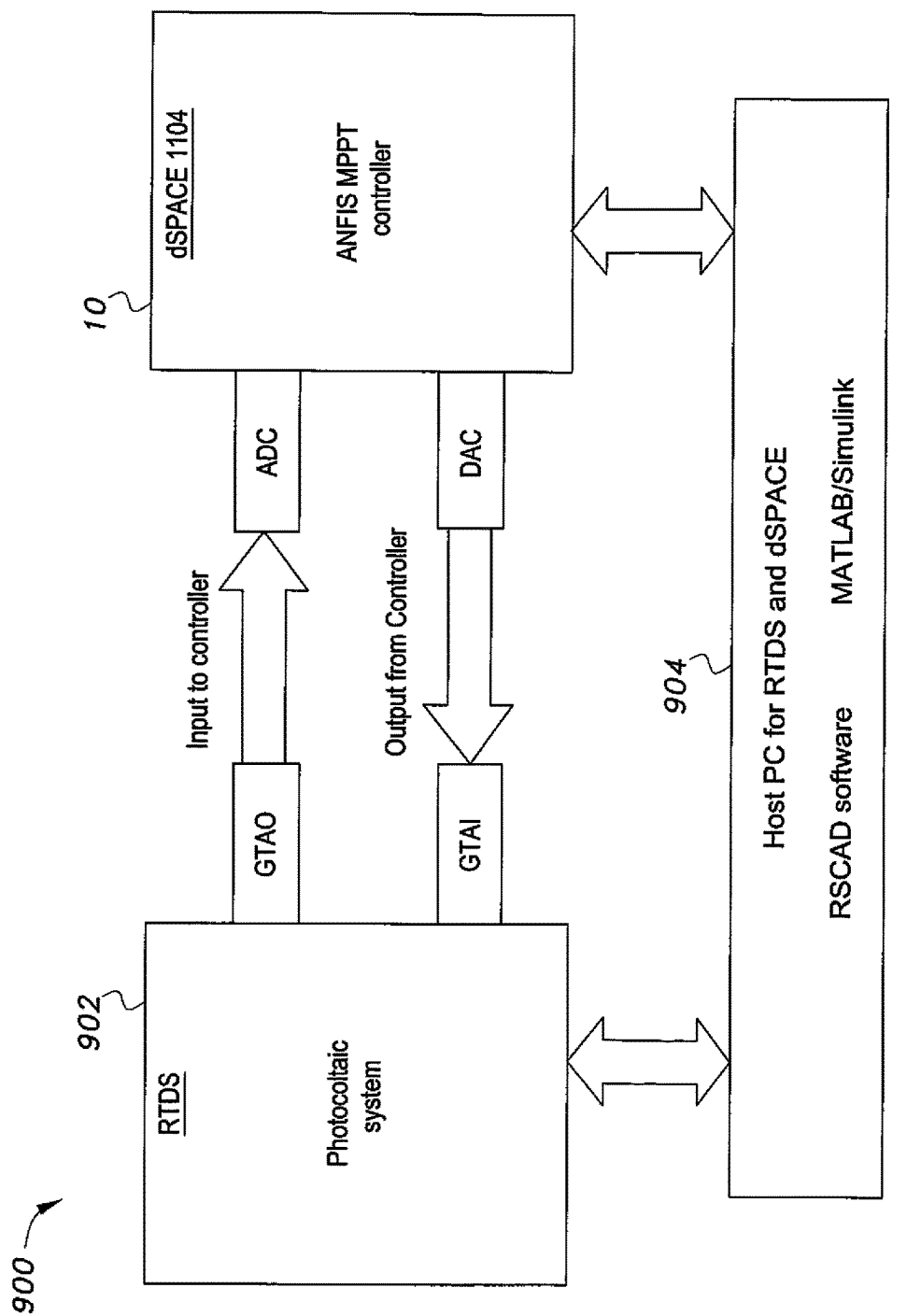
FIG. 9 is a block diagram of the simulator for the ANFIS MPPT in a neuro-fuzzy control system for a grid-connected photovoltaic (PV) system according to the present invention.

The present ANFIS based MPPT controller design is implemented in real domain 300 using dSPACE DS1104, as shown in FIG. 3. Inputs to the present controller 10 are irradiation and temperature, and these are represented by DS1104ADC_C5 and DS1104ADC_C6 blocks in the real time Simulink model 300, respectively. The DS1104ADC_C5 and DS1104ADC_C6 blocks are obtained from a dSPACE library in Matlab/Simulink and convert the analog signal to digital signal. Similarly, the output of the present controller is $V_{ref}$ and is represented by DA1104DAC_C1, and converts the digital signal to analog (DAC). The blocks representing controller 10 and DAC are used to integrate the dSPACE controller with external analog signals and devices. As shown in FIG. 9, these blocks are linked to GTAO and GTAI of the RTDS 902. The DS1104ADC_C5 and DS1104ADC_C6 blocks are linked with the GTAO and accept the analog signals of temperature and irradiation as input, as shown in the closed loop control system 900 of FIG. 9. In the same way, DA1104DAC_C1 is linked with GTAI of RTDS and sends the control signal back to RTDS. The RTDS used is one rack, having three PB5 Processors, two GTnet cards, and one GTWIF card. The complete experimental set up includes the RTDS 902, dSPACE, and the host PC 904 containing the RSCAD interface software, as shown in FIG. 9. While the present adaptive neuro-fuzzy MPPT controller 10 has been demonstrated using a personal computer (PC) 904 and associated RTDS 902 with dSPACE modules, it should be understood by one of ordinary skill in the art that embodiments of the present adaptive neuro-fuzzy MPPT controller 10 can comprise software or firmware code executing on a computer, a microcontroller, a microprocessor, or a DSP processor; state machines implemented in application specific or programmable logic; or numerous other forms, and is in operable communication with the solar power array and buck converter for signal exchange between the processor, solar power array, and buck converter, the processor having software or firmware code for operating the adaptive neuro-fuzzy network, without departing from the spirit and scope of the present invention. Methods implementing the present adaptive neuro-fuzzy MPPT controller 10 can be provided as a computer program, which includes a non-transitory machine-readable medium having stored thereon instructions that can be used to program a computer (or other electronic devices) to perform a process according to the methods. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

Figure 10:
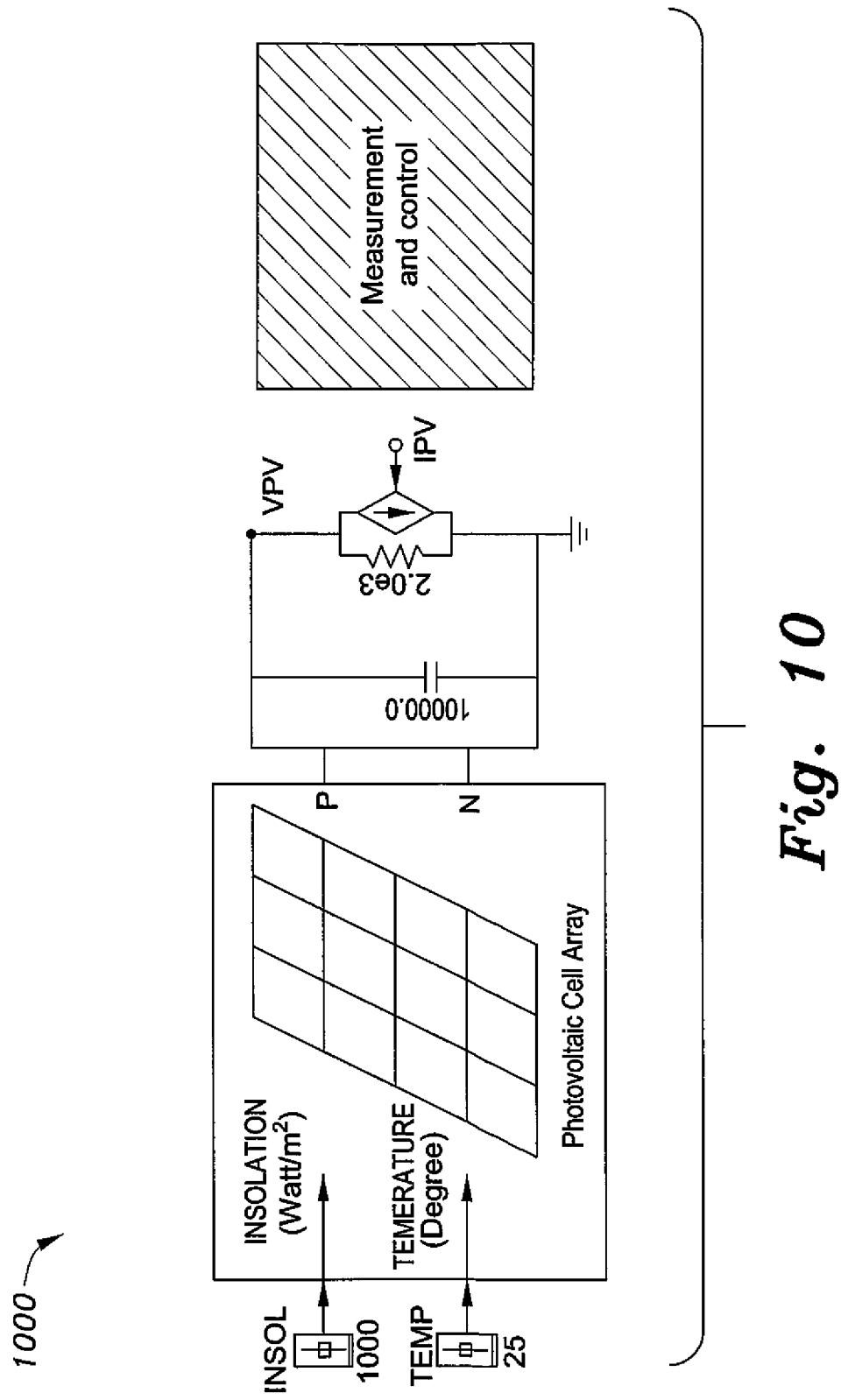
FIG. 10 is a block diagram showing the MPPT input parameters under measurement and control in a neuro-fuzzy control system for a grid-connected photovoltaic (PV) system according to the present invention.
Figure 11:
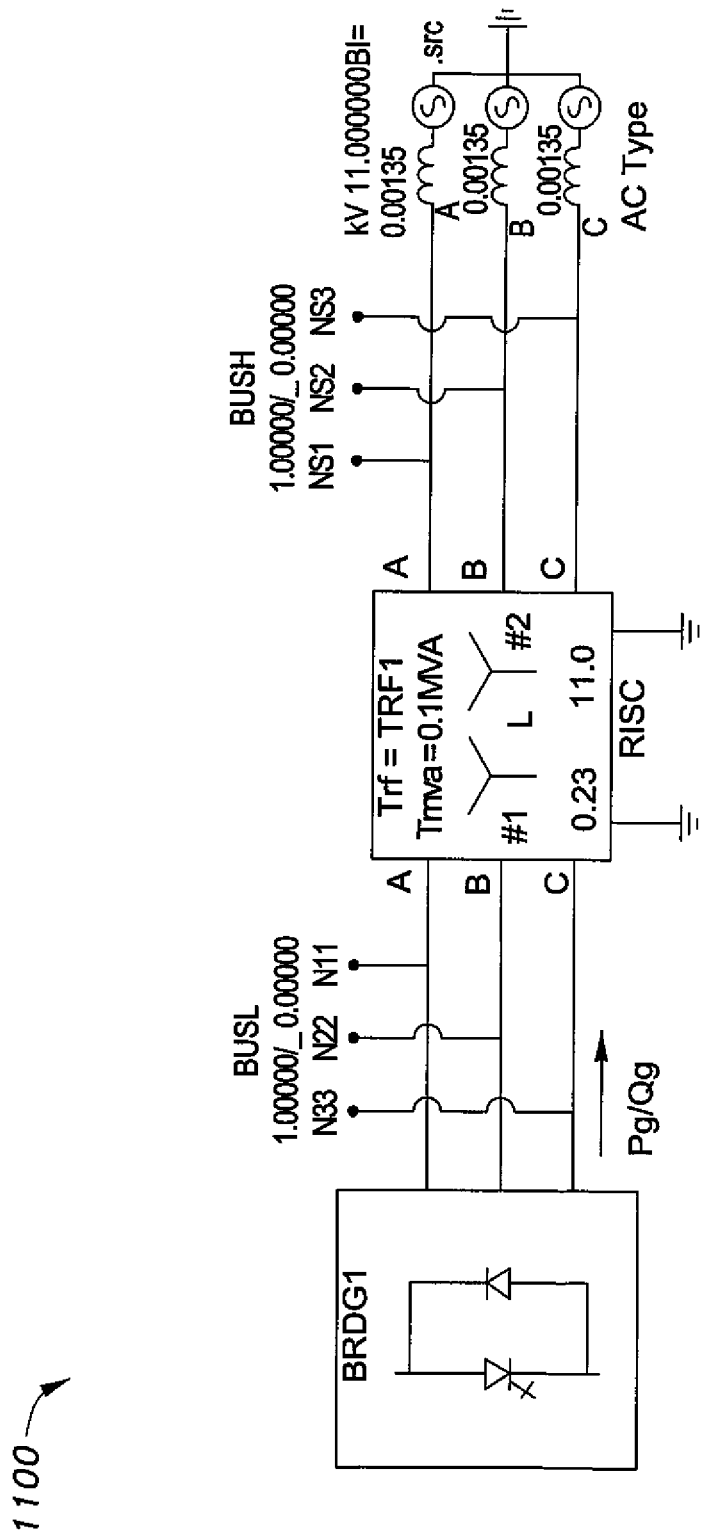
FIG. 11 is a block diagram showing a Real Time Digital Simulator (RTDS) model of the grid connected PV system under MPPT control in a neuro-fuzzy control system for a grid-connected photovoltaic (PV) system in a neuro-fuzzy control system for a grid-connected photovoltaic (PV) system according to the present invention.

A PV array with the specifications given in Table 2 is developed on RTDS. It includes 50 series connected modules and 20 parallel connected modules. FIGS. 10 and 11 show the complete RTDS model comprising a PV DC voltage source 1000 and a three-phase grid-connected AC supply 1100. For the reference solar intensity of 1000 W/m² and 25° C., the operating voltage $V_{MP}$ and current $I_{MP}$ at the MPPT will be 50×17.4 V=870 V, and 20×3.05 A−61 A, respectively. The expected maximum output power at this operating point from this PV array is 53 kW (870V×61 A). The carrier frequency used by the VSI is 1620 Hz (27×60 Hz). To demonstrate the effectiveness of the present ANFIS-based MPPT and grid-connected PV system, a step change in irradiation from 500 to 1000 W/m² was applied, and a step change in temperature from 25 to 50° C. was applied.

TABLE 2

PV Panel Parameters

| Parameter | Value |
|---|---|
| Open Circuit Voltage | 21.7 V |
| Short circuit current | 3.35 A |
| Voltage at PMAX | 17.4 V |
| Current at PMAX | 3.05 A |
| Number of PV cells in each model | 36 |
| Ideality factor of PV diode | 1.5 |
| Temperature Dependancy factor | 3 |
| Reference Temperature | 25° C. |
| Temperature Coefficient of ISC | 0.065 |
| Reference solar intensity | 1000 W/m² |

Figure 12:
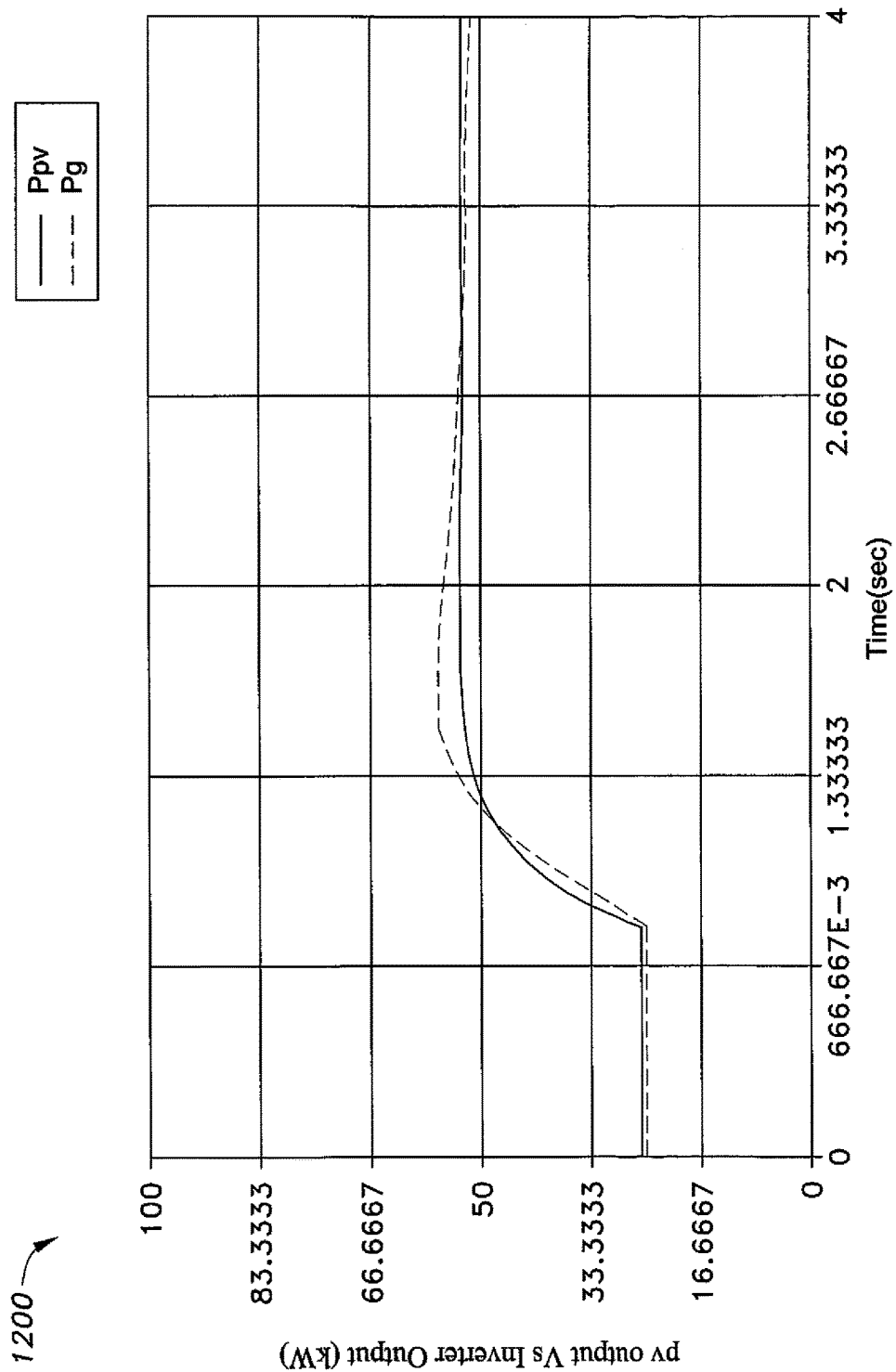
FIG. 12 is a plot showing PV array output power and inverter output power in a neuro-fuzzy control system for a grid-connected photovoltaic (PV) system according to the present invention.
Figure 13:
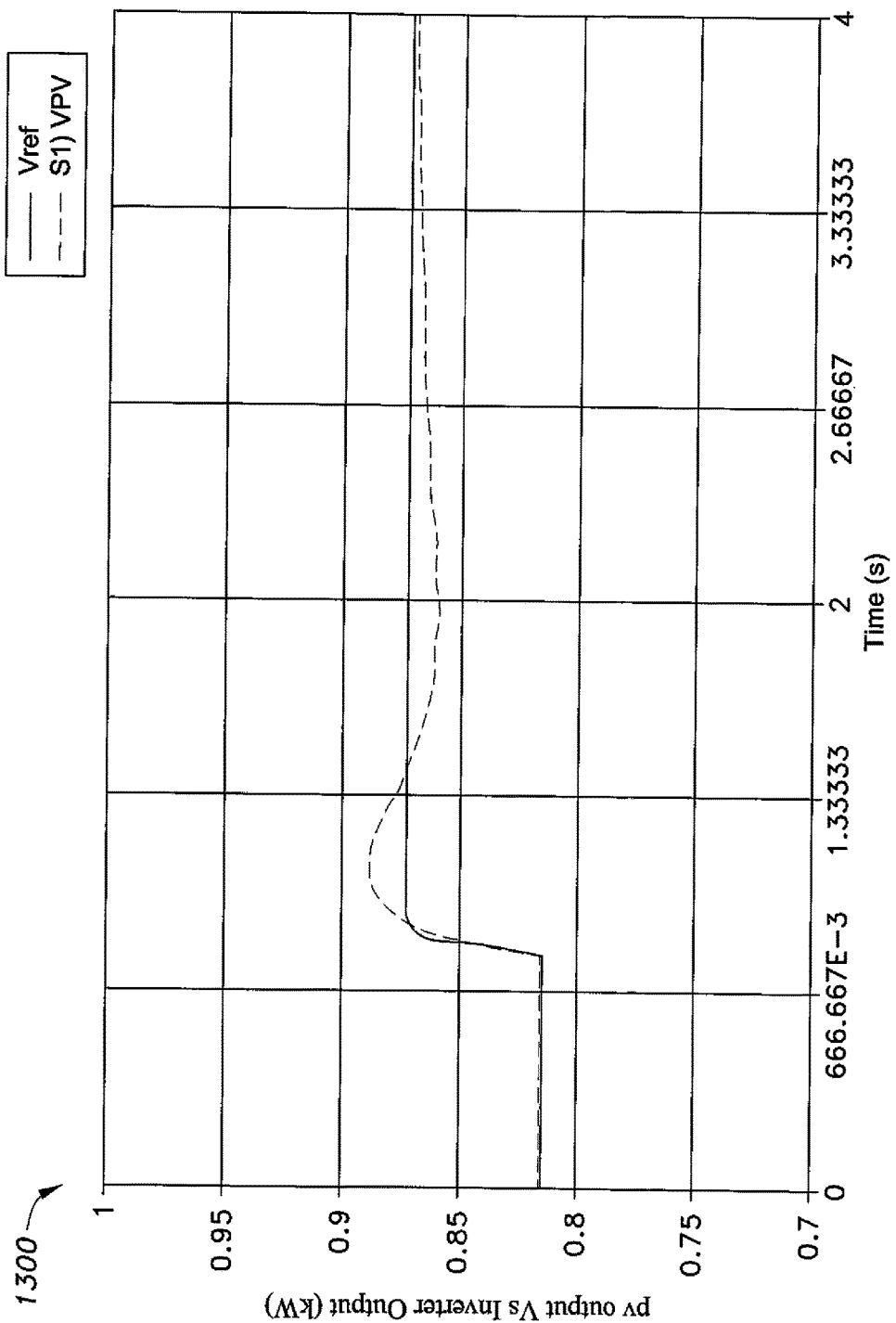
FIG. 13 is a plot showing PV array output voltage and MPPT output voltage in a neuro-fuzzy control system for a grid-connected photovoltaic (PV) system according to the present invention.
Figure 14:
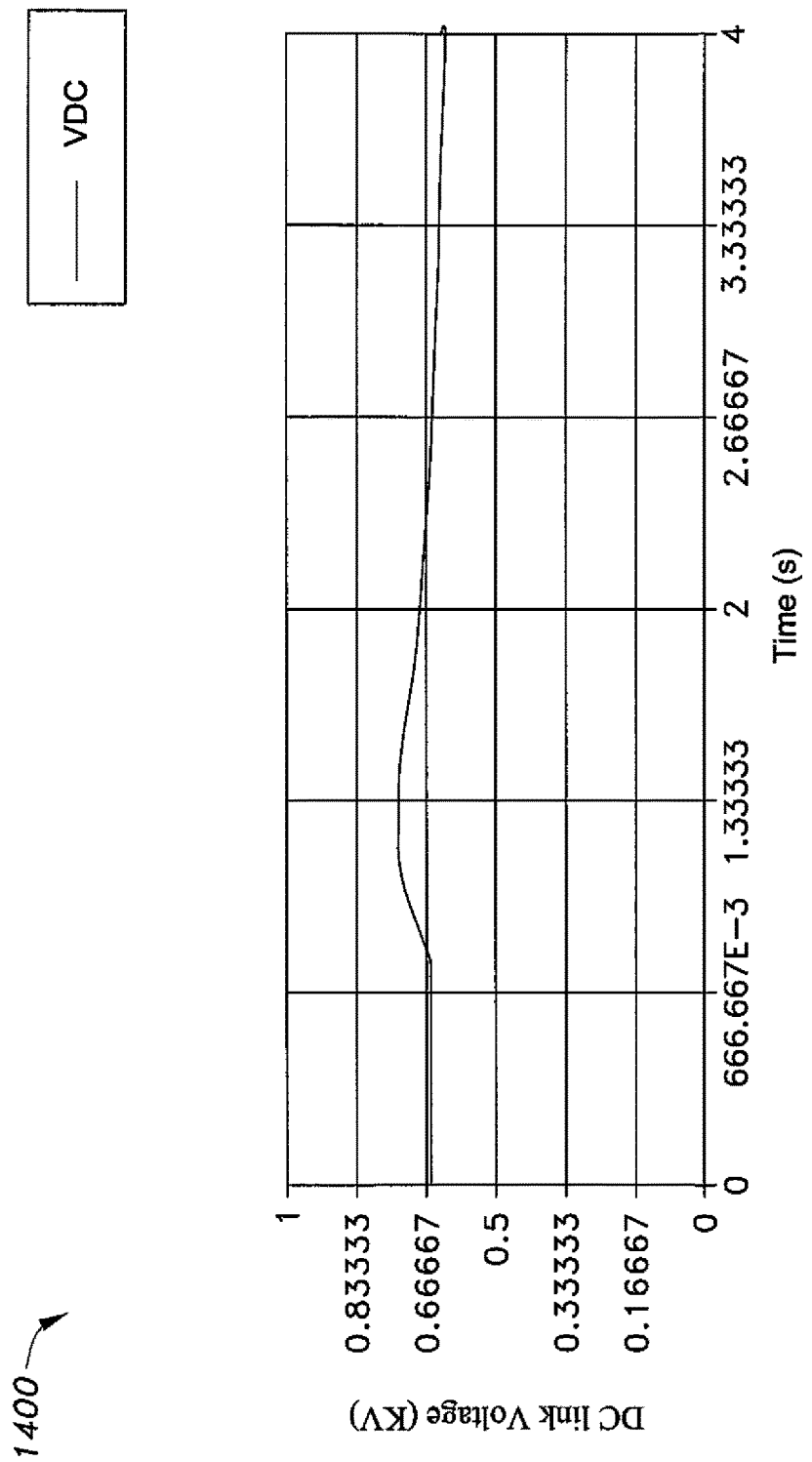
FIG. 14 is a plot showing DC link voltage and current in a neuro-fuzzy control system for a grid-connected photovoltaic (PV) system according to the present invention.
Figure 15:
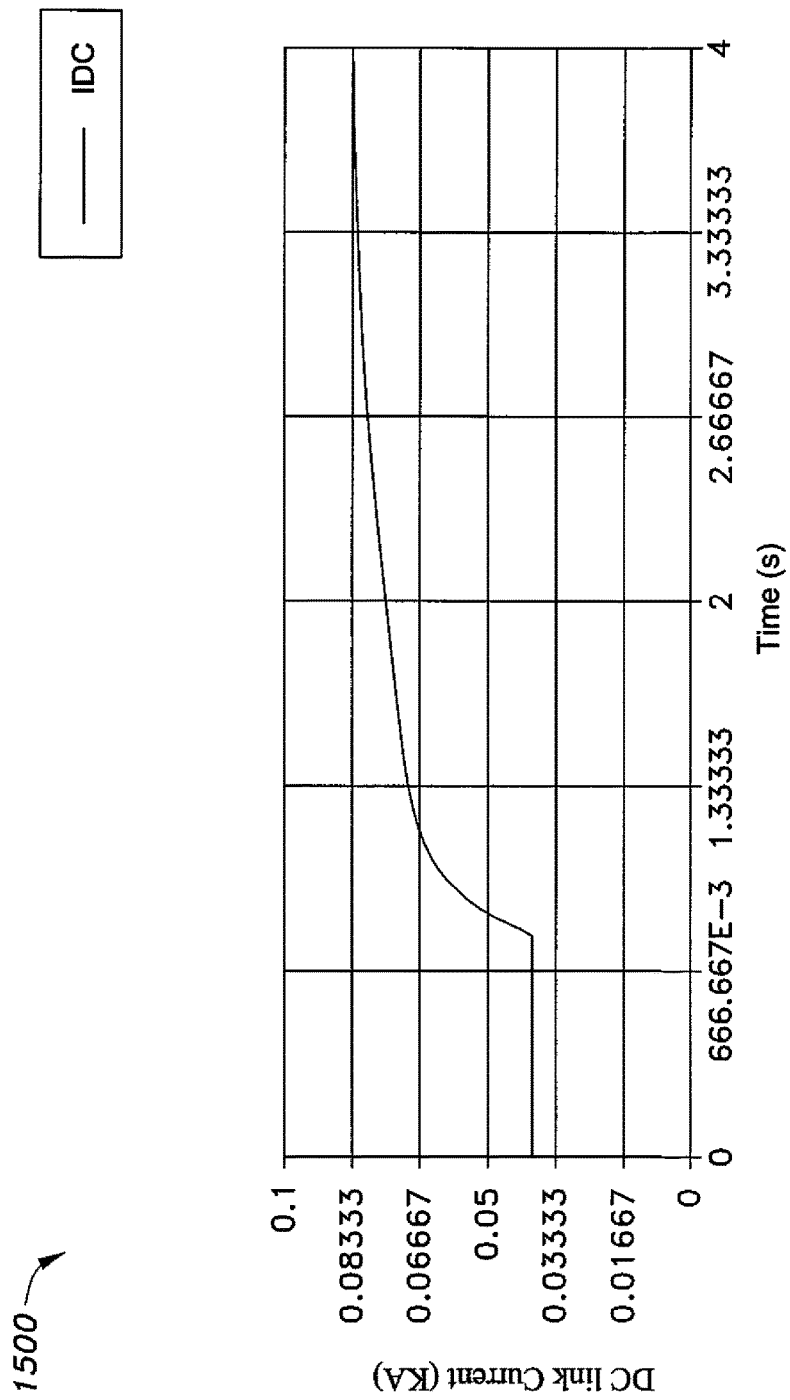
FIG. 15 is a plot showing DC link current in a neuro-fuzzy control system for a grid-connected photovoltaic (PV) system according to the present invention.
Figure 16:
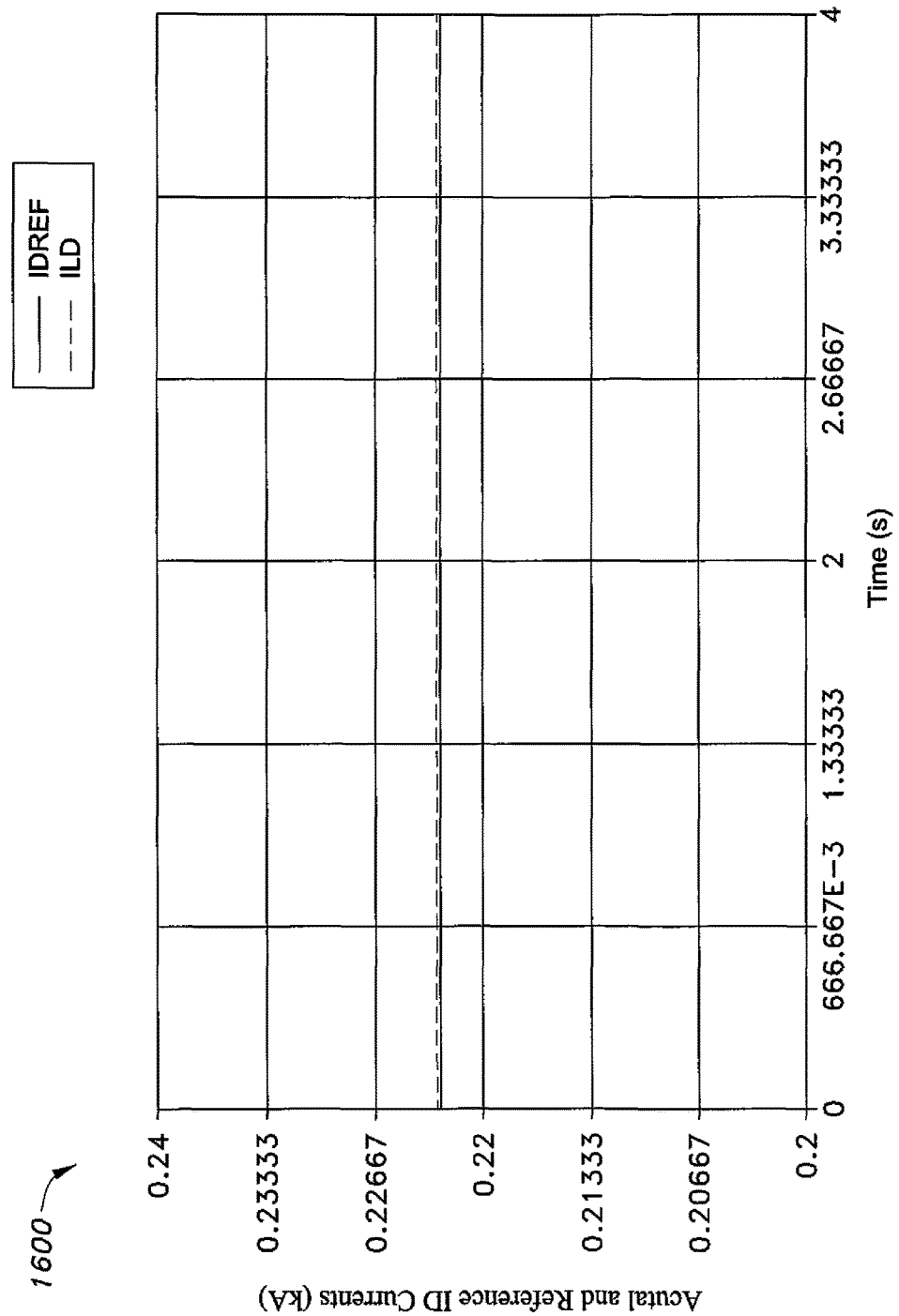
FIG. 16 is a plot showing actual and reference D-axis inverter currents in a neuro-fuzzy control system for a grid-connected photovoltaic (PV) system according to the present invention.
Figure 17:
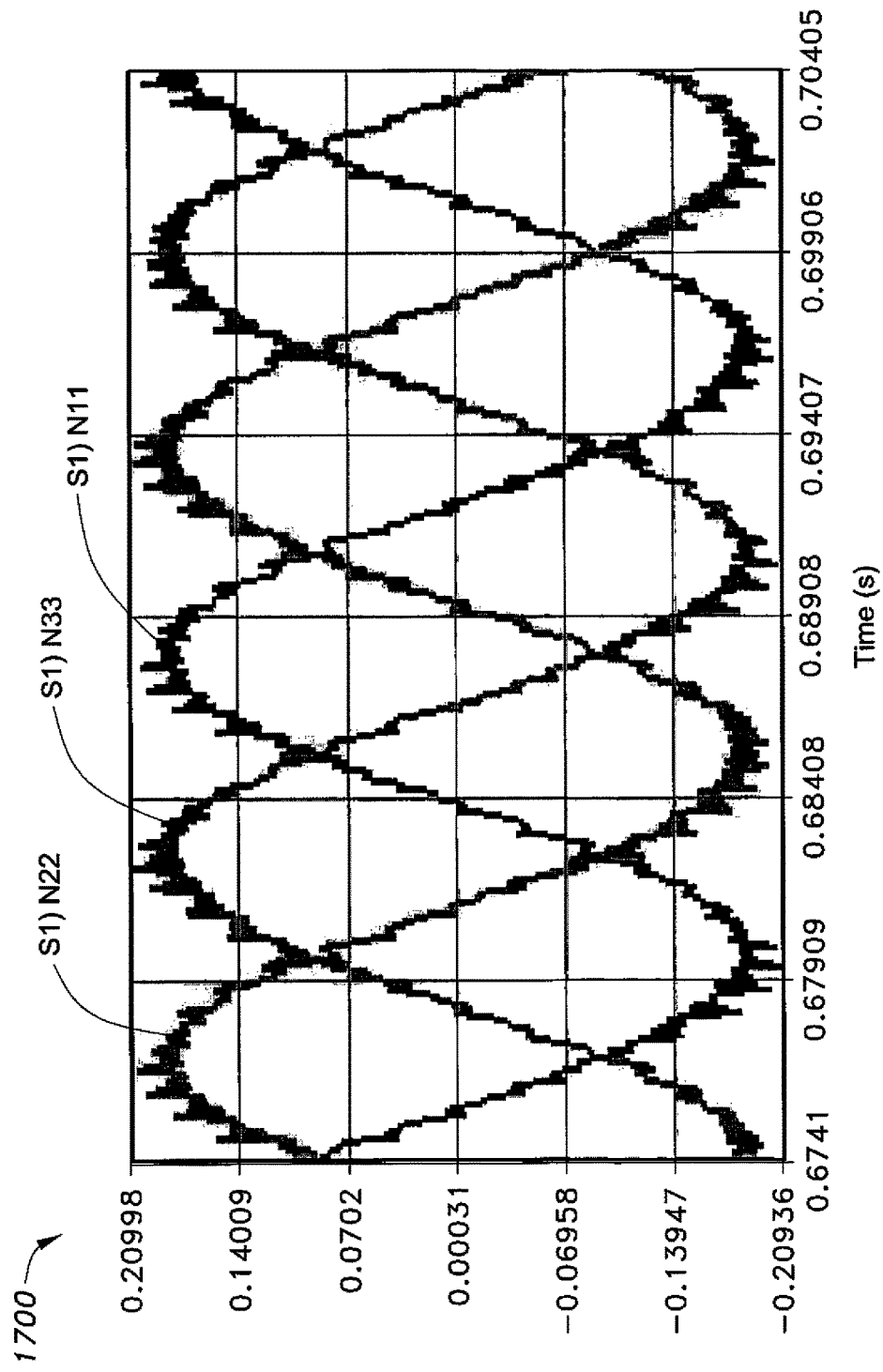
FIG. 17 is a plot showing the 3-phase inverter output voltage in a neuro-fuzzy control system for a grid-connected photovoltaic (PV) system according to the present invention.
Figure 18:
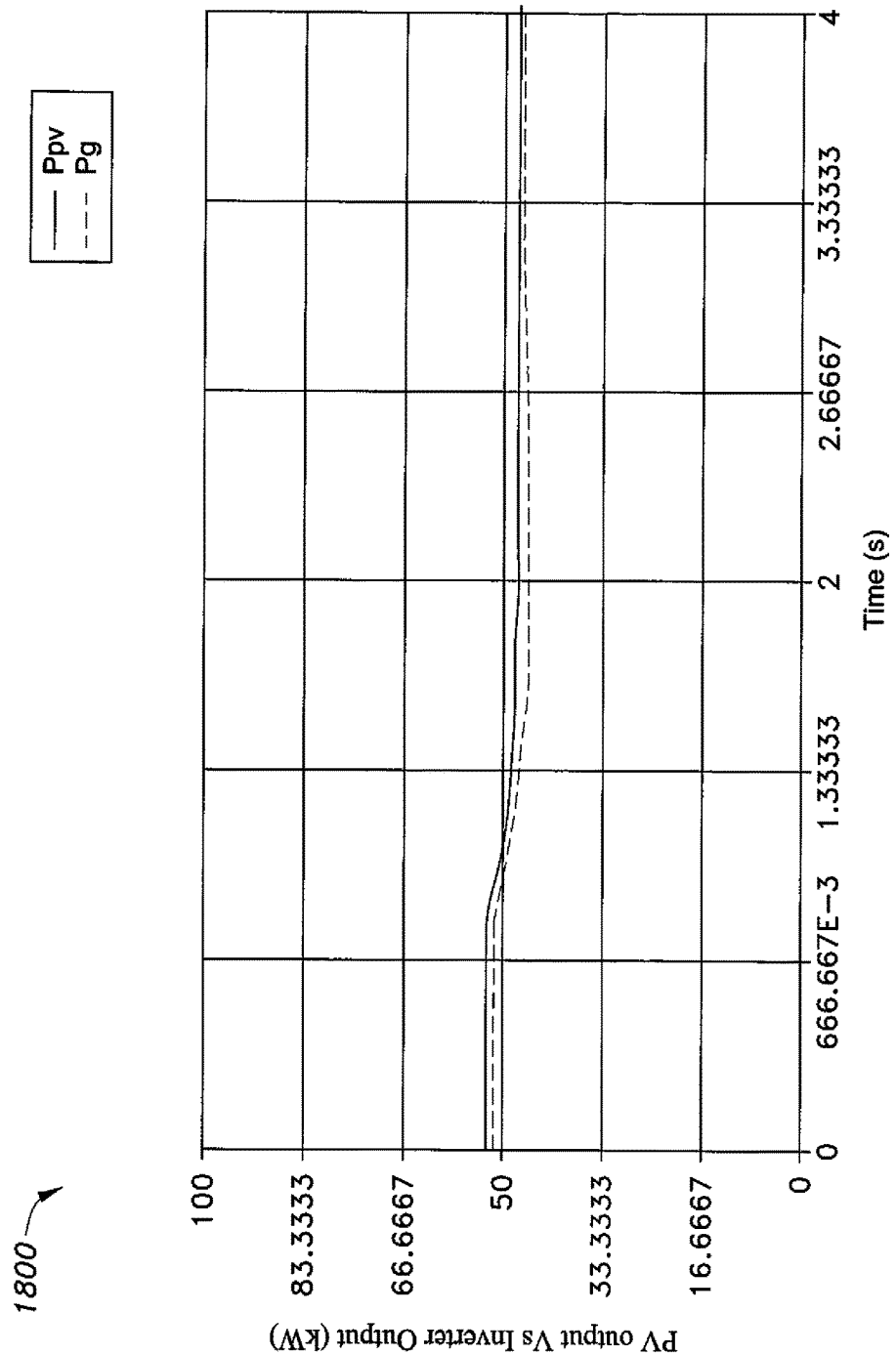
FIG. 18 is a plot showing PV array output power and inverter output power in a neuro-fuzzy control system for a grid-connected photovoltaic (PV) system according to the present invention.

The first disturbance applied to check the efficiency of the present controllers is a step change in irradiation from 500 to 1000 W/m², keeping the temperature constant. The applied disturbance and response of the system are presented in FIGS. 12-17. The present MPPT controller tracks the maximum voltage from the PV array, and maximum power $P_{PV}$ is generated. The inverter controller is able to transfer the generated power by the PV array to the grid $P_g$. As shown in the plot 1200 of FIG. 12, the two powers are exactly identical, with a generated power of 53 kW at the normal operating point of 1000 W/m² and 25° C. Plot 1300 of FIG. 13 shows the output of the ANFIS-based MPPT controller output voltage $V_{ref}$ and shows how the DC-DC converter controller forces the PV array to track the MPP at a maximum PV array voltage $V_{PV}$. The DC link voltage, shown in plot 1400 of FIG. 14, is kept constant by the inverter controller, which permits the current (shown as plot 1500 of FIG. 15) to be controllable. A voltage of 650V is used as a reference constant DC link voltage, and the DC current varies depending on the change in irradiation and temperature, as shown in FIGS. 14 and 15. The D-axis current component is responsible for real power transfer to the grid, and the inverter controller keeps error between the actual and reference D-axis current close to 0, as shown in plot 1600 of FIG. 16. The inverter output voltage is shown in plot 1700 of FIG. 17. The DC offset voltage is removed by the transformer connected between the inverter and the grid.

Figure 19:
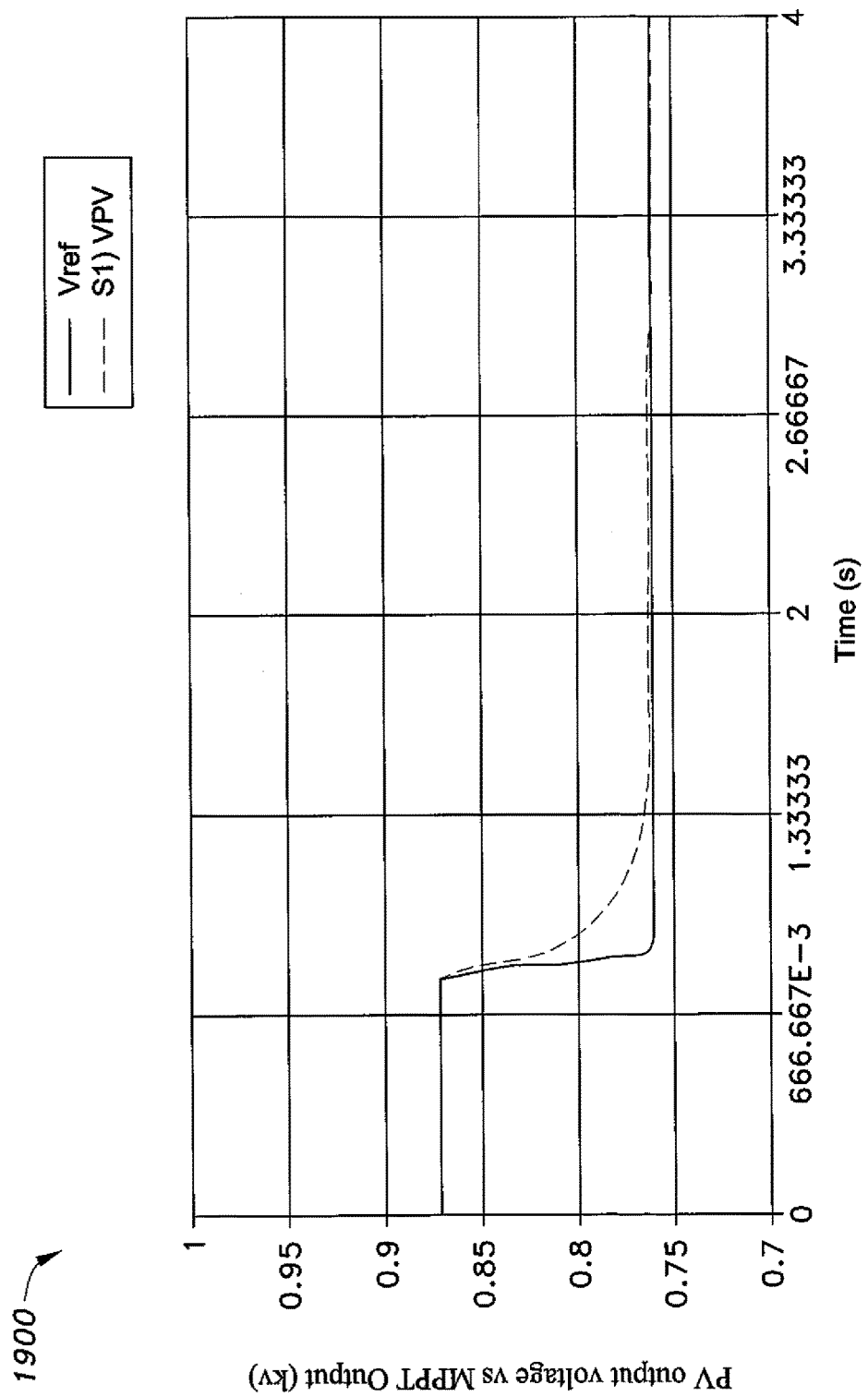
FIG. 19 is a plot showing PV array output voltage and MPPT output voltage in a neuro-fuzzy control system for a grid-connected photovoltaic (PV) system according to the present invention.
Figure 20:
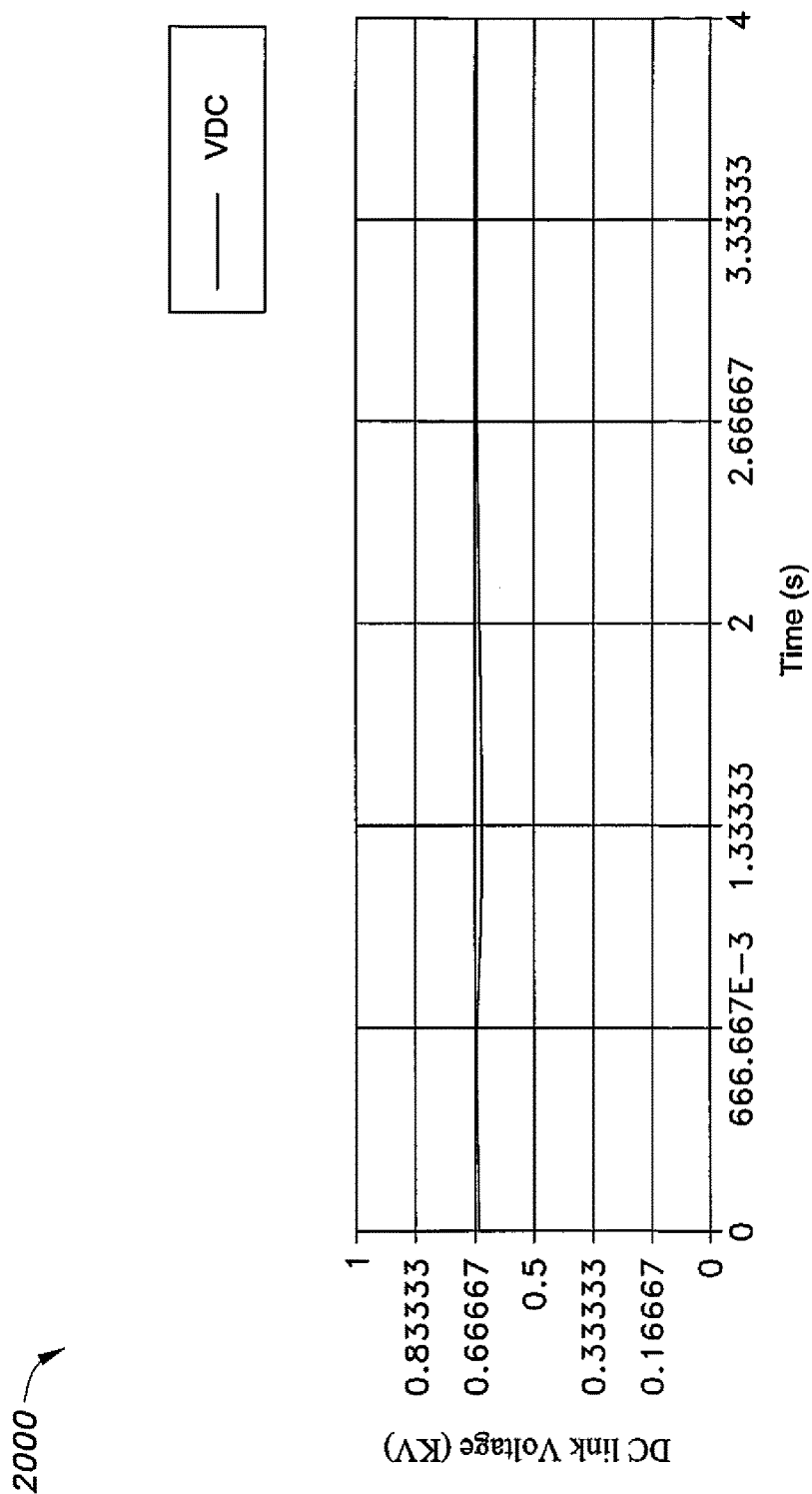
FIG. 20 is a plot showing DC link voltage in a neuro-fuzzy control system for a grid-connected photovoltaic (PV) system according to the present invention.
Figure 21:
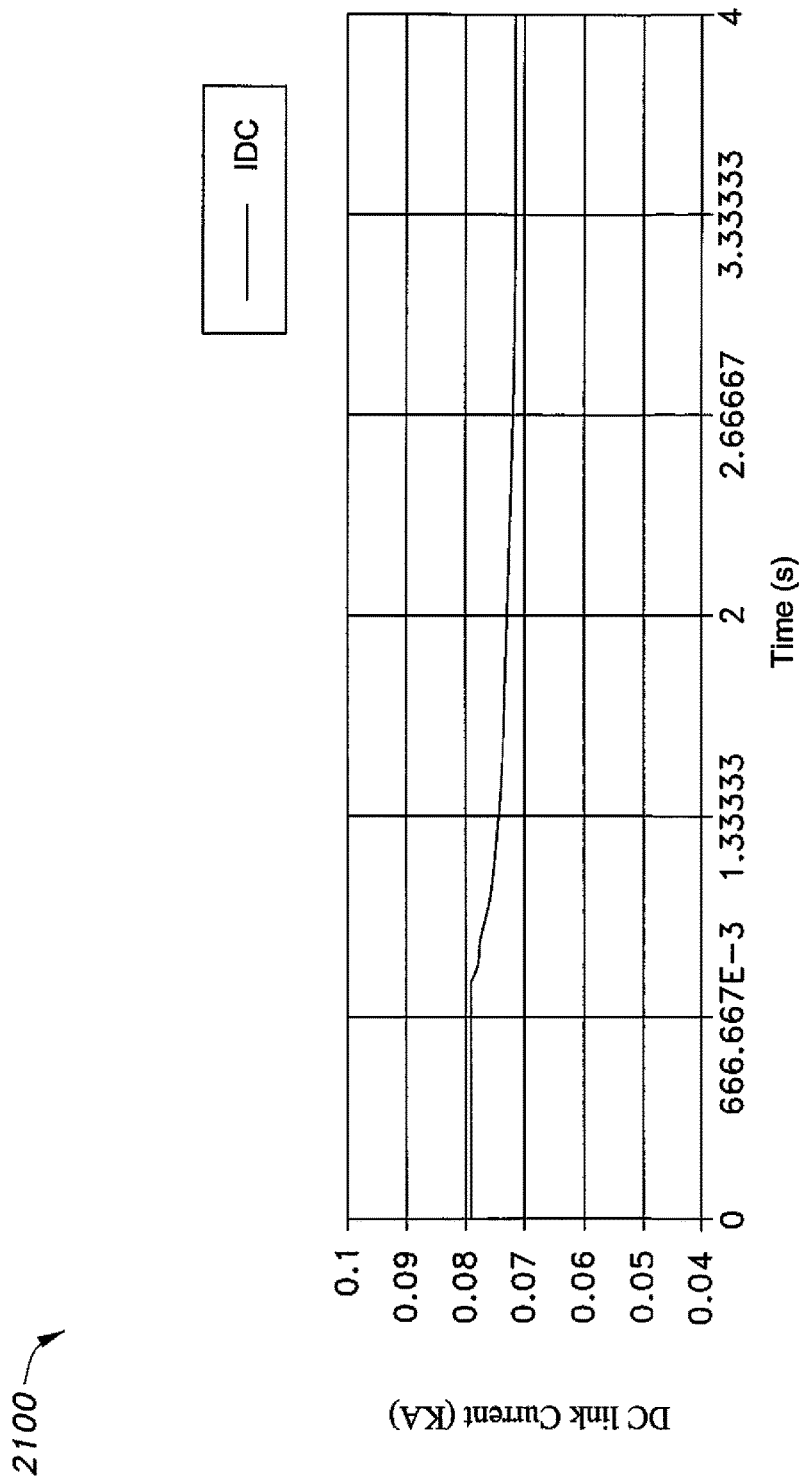
FIG. 21 is a plot showing DC link current in a neuro-fuzzy control system for a grid-connected photovoltaic (PV) system according to the present invention.
Figure 22:
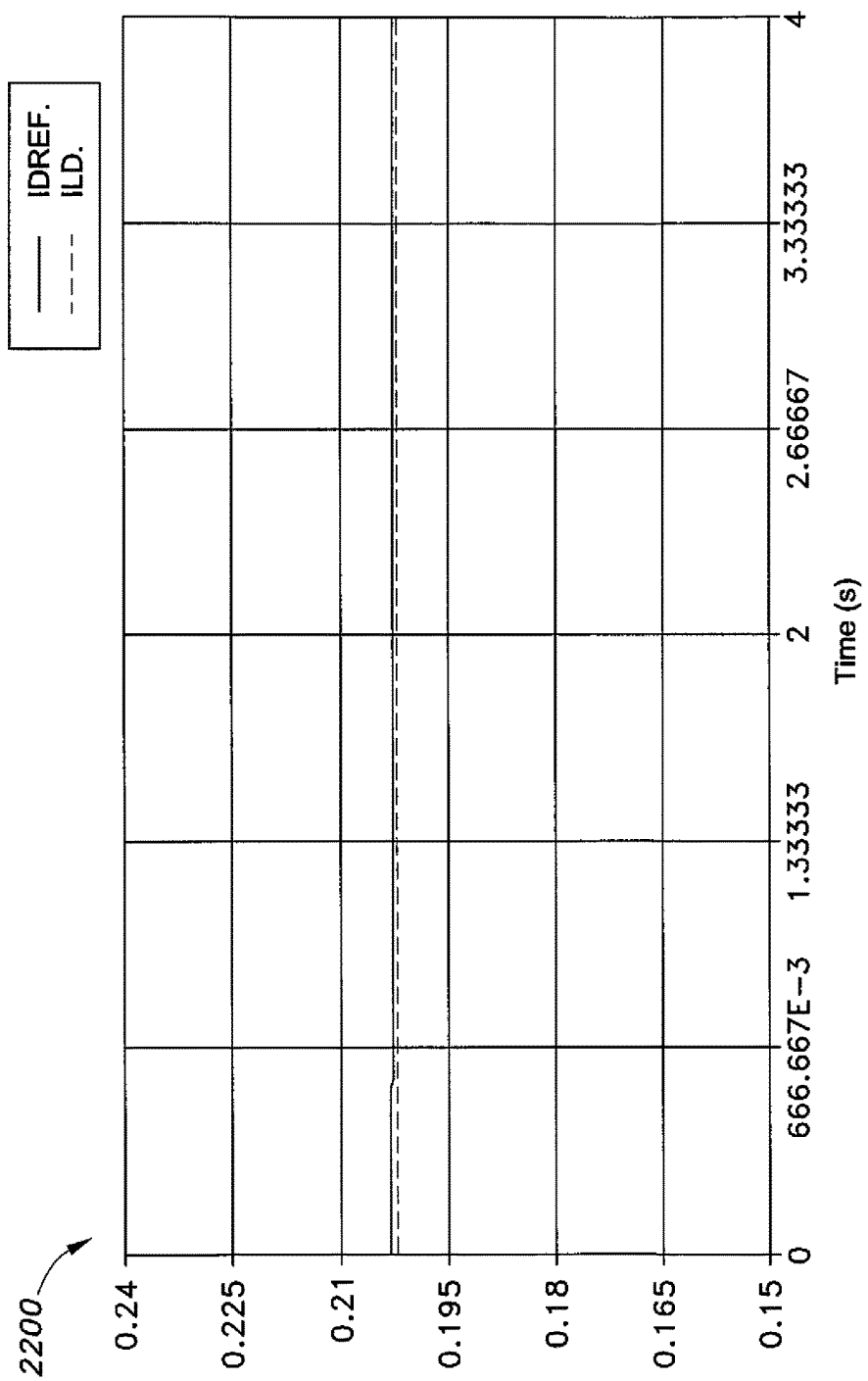
FIG. 22 is a plot showing actual and reference D-axis inverter currents in a neuro-fuzzy control system for a grid-connected photovoltaic (PV) system according to the present invention.
Figure 23:
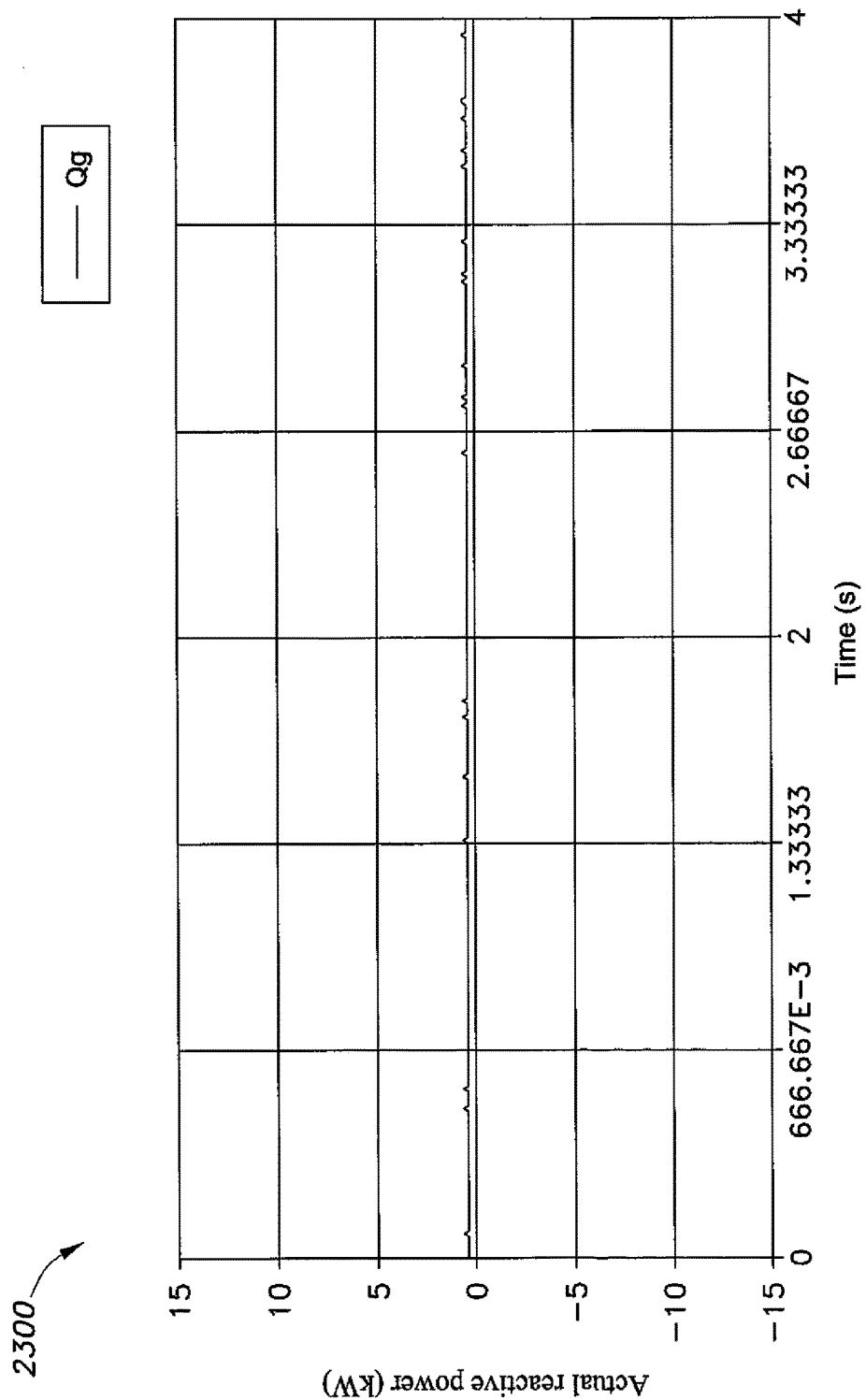
FIG. 23 is a plot showing actual reactive power from the grid side in a neuro-fuzzy control system for a grid-connected photovoltaic (PV) system according to the present invention.

The second disturbance applied to check the robustness of the controller is a step change in temperature from 25 to 50° C., keeping the irradiation level at 1000 W/m². From the PV array electrical characteristics, the output power gets reduced at higher temperature, and the results are shown in FIGS. 18-23. The grid power $P_g$ follows the PV array output power $P_{PV}$, as shown in plot 1800 of FIG. 18, and the value has decreased from the nominal 53 kW, since the temperature has increased. Plot 1900 of FIG. 19 shows the PV array output voltage and the MPPT voltage following each other, as proposed by the controller. Similar to the irradiation change, the inverter controller keeps the DC link voltage constant for step change in temperature, as shown in plot 2000 of FIG. 20, while the link current is maintained, as shown in plot 2100 of FIG. 21. The inverter controller keeps the actual and reference D-axis component inverter currents close to each other, as shown in plot 2200 of FIG. 22. For unity power factor, the reference reactive power is kept 0, and from plot 2300 of FIG. 23, the actual measured reactive power $Q_g$ is around 0.

Figure 24:
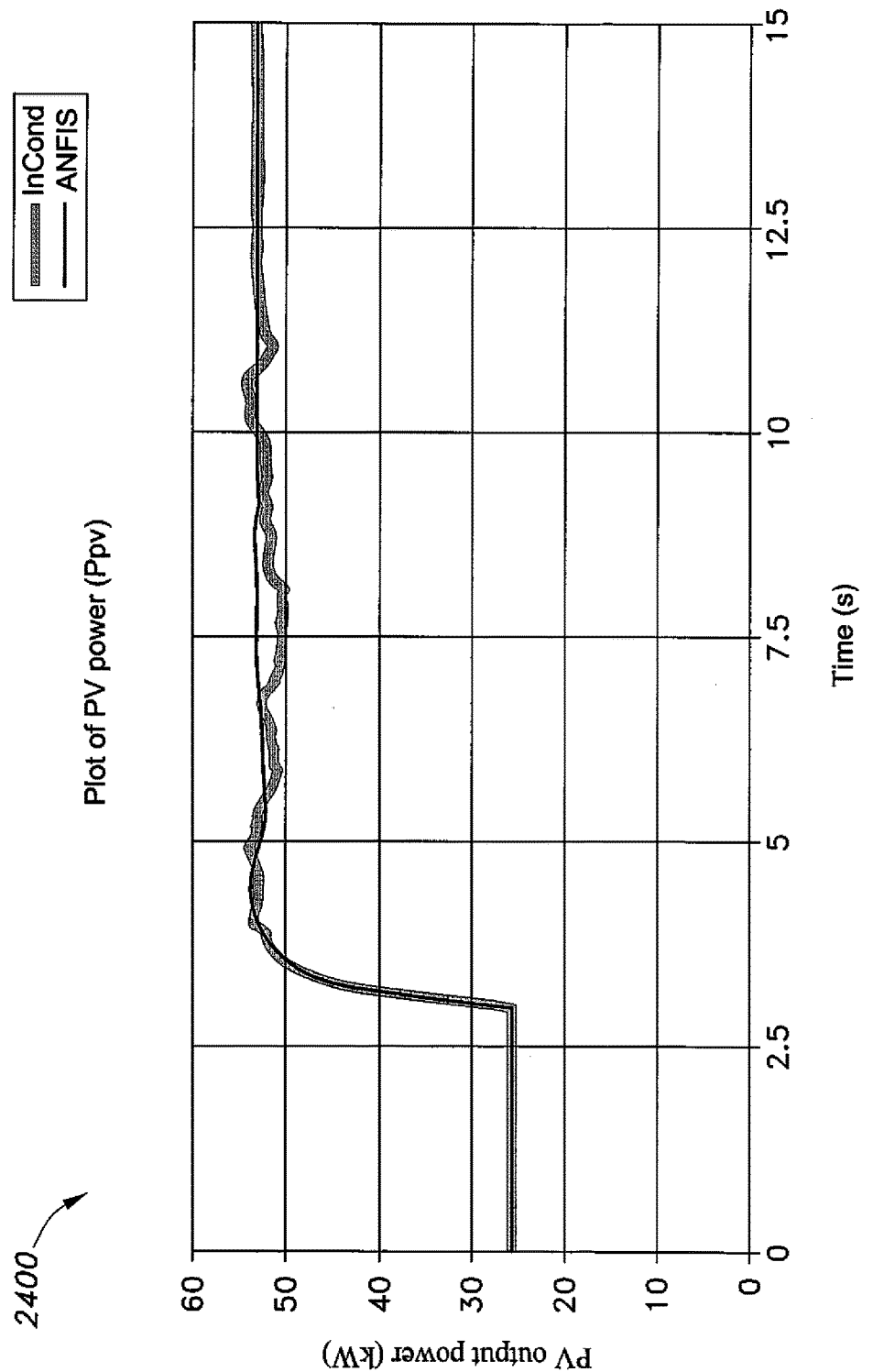
FIG. 24 is a plot showing PV output power for step up change in irradiation in a neuro-fuzzy control system for a grid-connected photovoltaic (PV) system according to the present invention.
Figure 25:
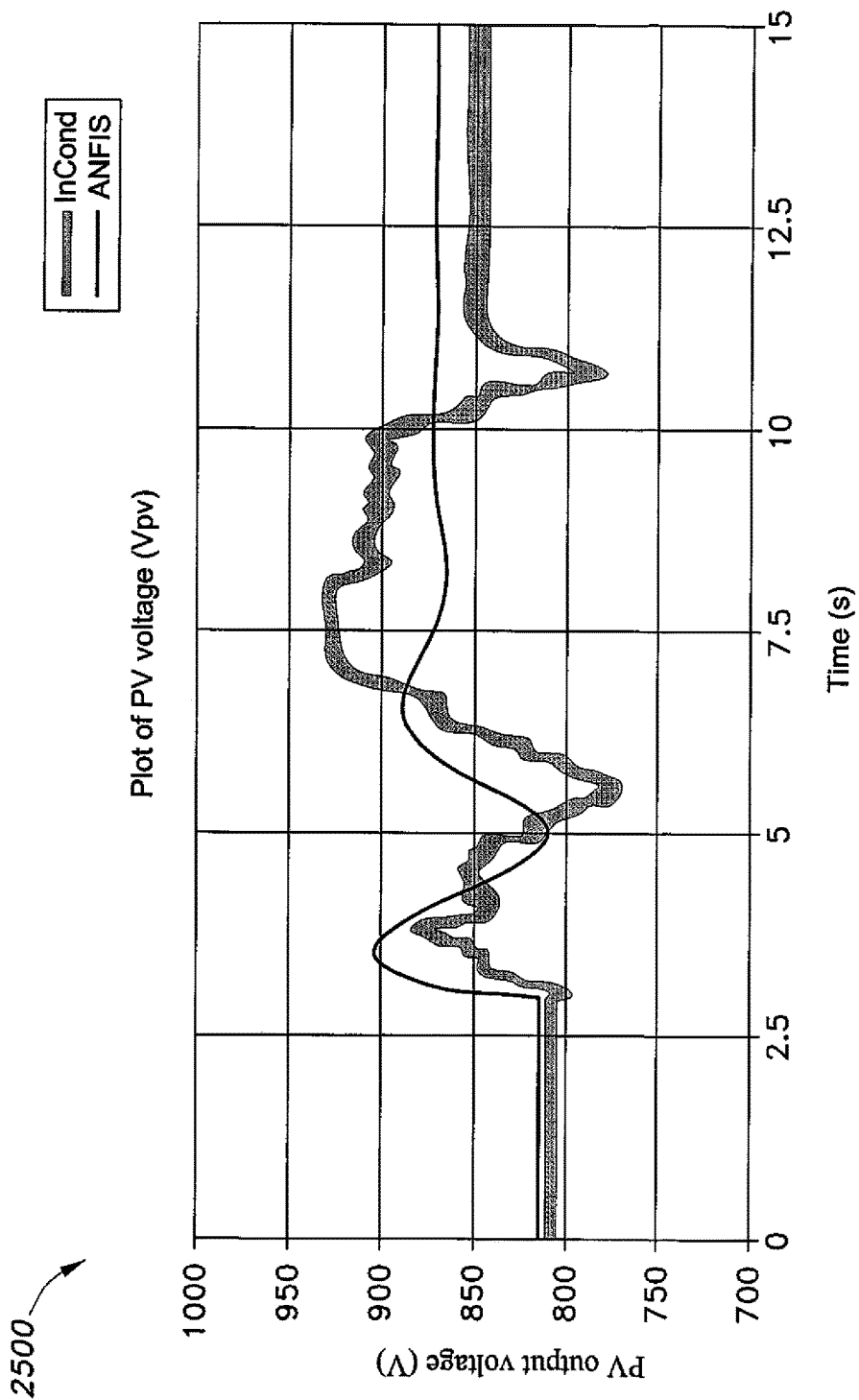
FIG. 25 is a plot showing PV voltage for step up change in irradiation in a neuro-fuzzy control system for a grid-connected photovoltaic (PV) system according to the present invention.
Figure 26:
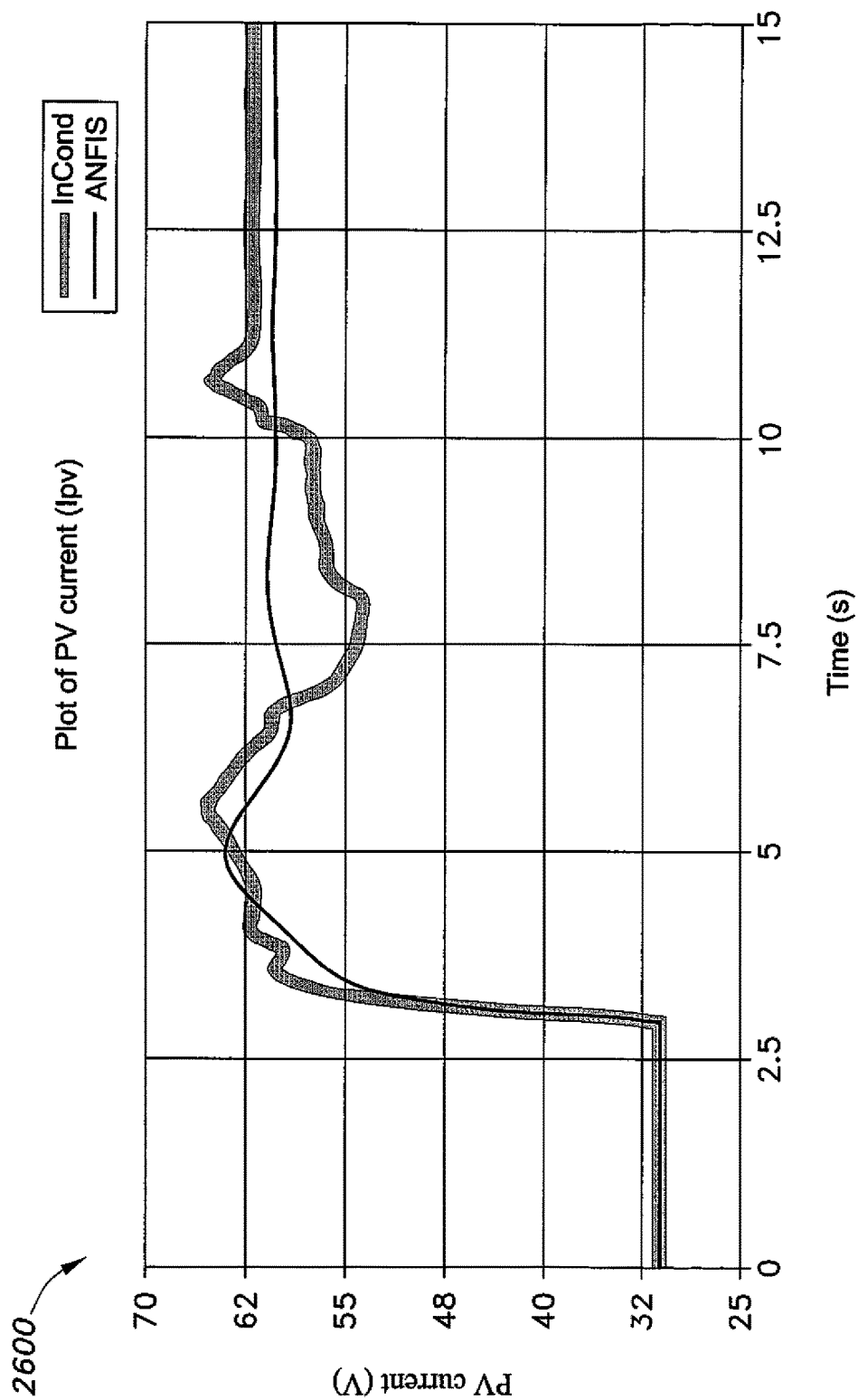
FIG. 26 is a plot showing PV current for step up change in irradiation in a neuro-fuzzy control system for a grid-connected photovoltaic (PV) system according to the present invention.

Experimentally, a series of tests were conducted in the RTDS and dSPACE DS1104 environment to examine the effectiveness of the present controller and evaluate its performance under different step changes in irradiation and temperature. The experimental comparison of PV power output $P_{PV}$ using the present ANFIS-based MPPT controller and incremental conductance (IC)-based controller is shown in plot 2400 of FIG. 24. The results clearly demonstrate that the present controller has the capability to track the MPP much faster than the conventional IC controller without significant oscillations in steady state. The PV output voltage and current under the step-up change in irradiation are shown in plots 2500 and 2600 of FIGS. 25 and 26, respectively. The results shown in FIGS. 25 and 26 confirm the effectiveness of the present controller and its superiority over a conventional controller. This verifies experimentally the competence of the present ANFIS-based MPPT over conventional methods under the disturbance considered.

Figure 27:
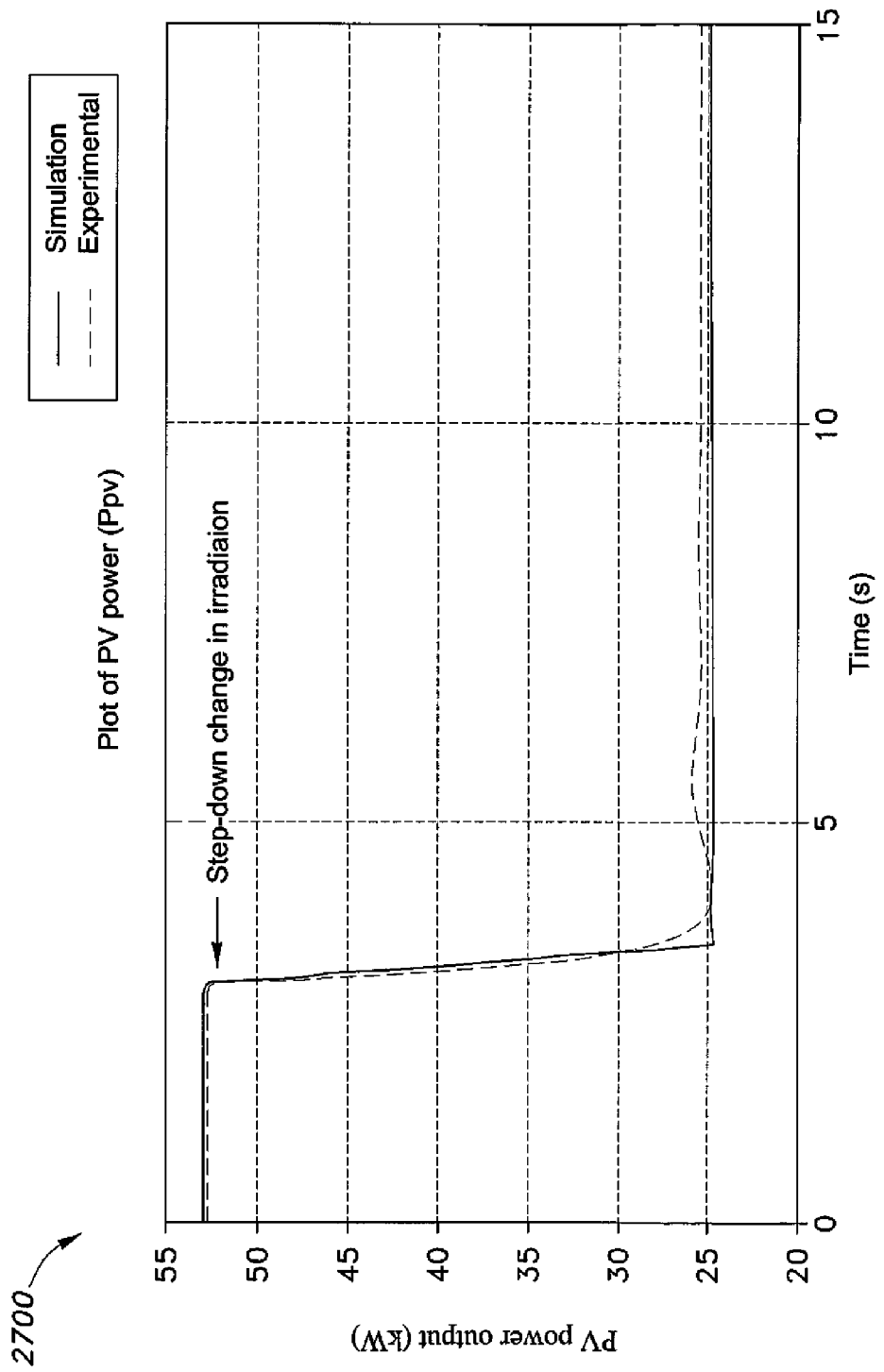
FIG. 27 is a plot showing comparison of PV power for step down change in irradiation in a neuro-fuzzy control system for a grid-connected photovoltaic (PV) system according to the present invention.
Figure 28:
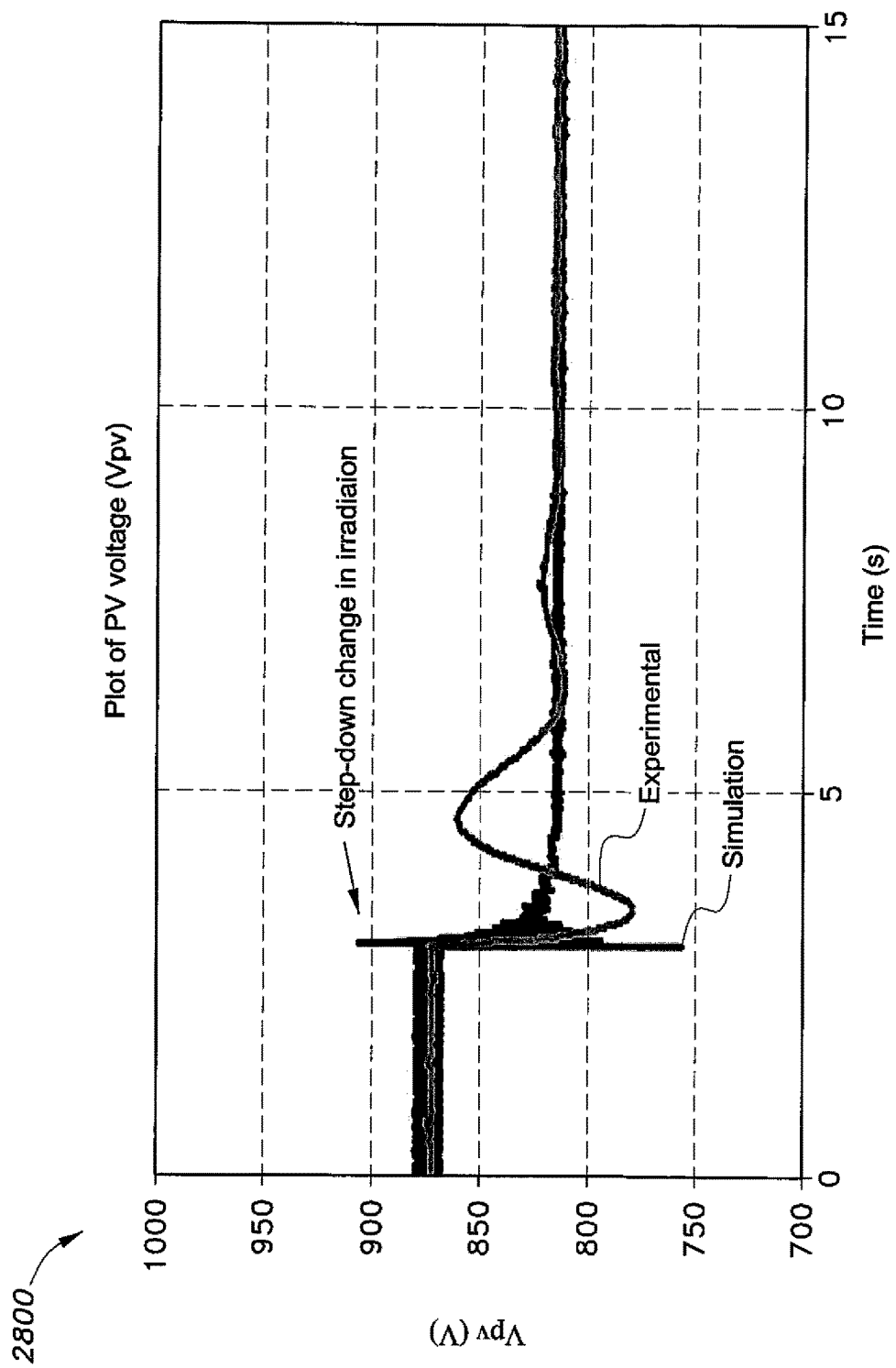
FIG. 28 is a plot showing comparison of PV voltage for step down change in irradiation in a neuro-fuzzy control system for a grid-connected photovoltaic (PV) system according to the present invention.
Figure 29:
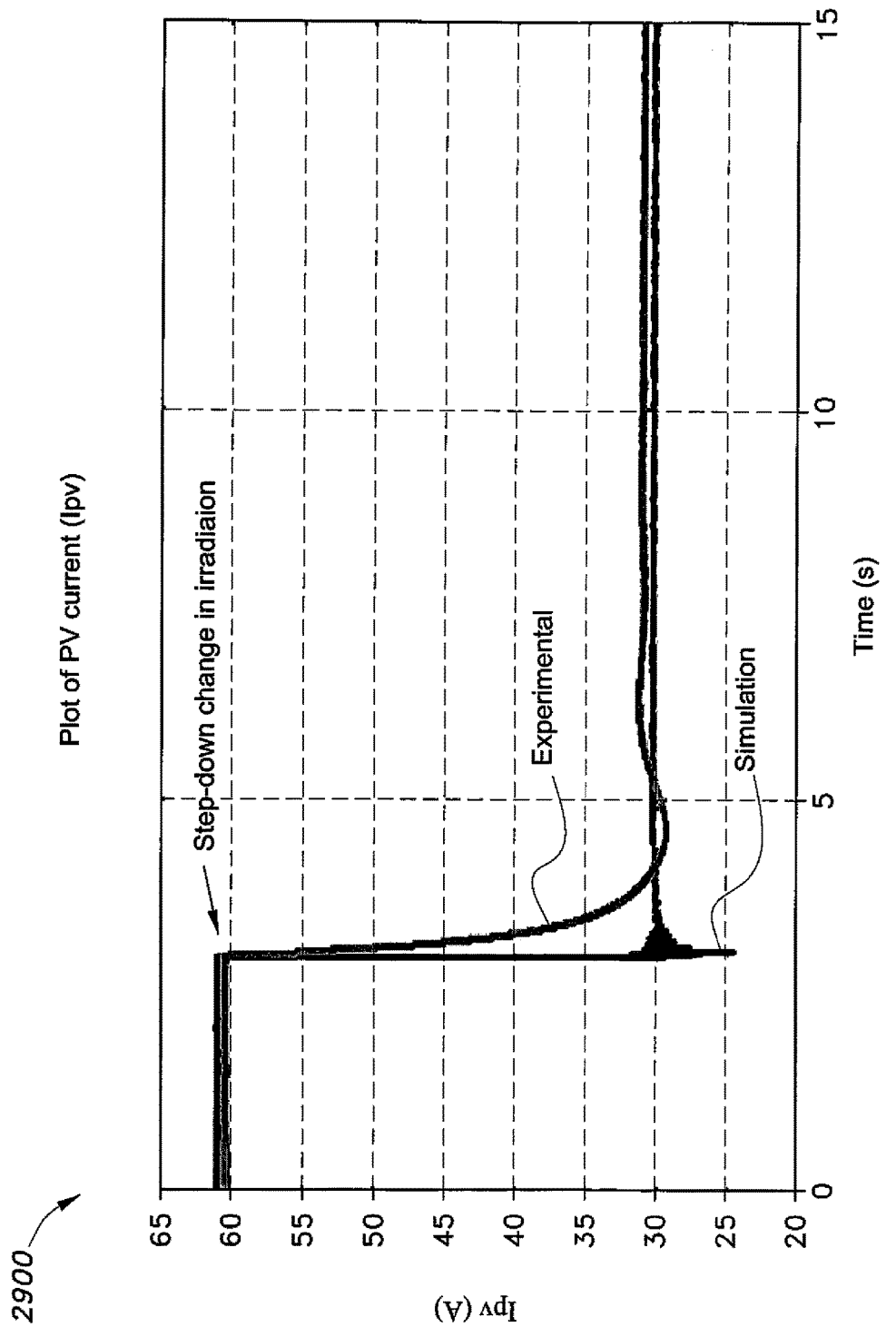
FIG. 29 is a plot showing comparison of PV current for step down change in irradiation in a neuro-fuzzy control system for a grid-connected photovoltaic (PV) system according to the present invention.

Furthermore, a comparison was made between the simulation results in Matlab/Simulink and the experimental results to verify the accuracy of the present controller under the step-down change in irradiation. A comparison of the system response and performance under this disturbance is shown in FIGS. 27-29. The PV power output $P_{PV}$ is shown in plot 2700 of FIG. 27 which confirms the agreement between the experimental and simulation results, thereby demonstrating the potential of the present controller to track the MPP under this disturbance. Comparison for PV output voltage $V_{PV}$ and current $I_{PV}$ are illustrated in plots 2800 and 2900 of FIGS. 28 and 29, respectively. It can be noticed that the simulation results are very much similar to the experimental results, which verifies experimentally the effectiveness of the proposed controller under the considered disturbance.

An ANFIS-based MPPT controller 10 with independent active and reactive controller 800 for a grid connected PV system 400 has been disclosed. The present ANFIS-based MPPT controller 10 is trained to force the PV array to work at the maximum power point. The trained controller has been experimentally implemented on dSPACE. A vector controller is implemented on RTDS to control independently the active and reactive power. RTDS and dSPACE were used to assess the validity of the proposed controllers. Results show that the present controllers are efficient in delivering the maximum power from the PV to the grid. The comparison with IC-based MPPT shows the superiority of the present ANFIS-based controller 10 in tracking the maximum power point. Research for the above was funded by the National Plan for Science, Technology and Innovation (MAARIFAH), located in King Abdulaziz City for Science and Technology, Kingdom of Saudi Arabia, award number 11-ENE1632-04.

It is to be understood that the present invention is not limited to the embodiments described above, but encompasses any and all embodiments within the scope of the following claims.

We claim:

1. A neuro-fuzzy control system for a grid-connected photovoltaic (PV) system, comprising:
a solar power array outputting a panel voltage $V_{PV}$;
a DC-DC converter operably connected to the solar power array;
a proportional-integral (PI) controller operably connected to the DC-DC converter, the PI controller controlling a duty cycle of the DC-DC converter;
a processor in operable communication with the solar power array, the processor including means for receiving temperature and irradiance information from the solar power array and means for operating an adaptive neuro-fuzzy network, the adaptive neuro-fuzzy network outputting a reference voltage $V_{ref}$; and
means for applying a reference input to the PI controller, the reference input being characterized by the relation $(V_{ref}-V_{PV})$;
wherein the maximum power point (MPPT) of the PV array is successfully allocated under varying temperature and irradiance values of the PV array.

2. The neuro-fuzzy control system according to claim 1, further comprising means for training the adaptive neuro-fuzzy network, the training means having:
means for estimating parameters of the PV array, the PV array parameters being $I_L$, the light generated current, $I_0$, the diode saturation current, $R_S$ and $R_{SH}$ being the series and parallel resistance respectively, and a being the diode modified ideality factor;
means for initializing size of the PV array, the PV array size being characterized by variables $N_{ss}$, $N_{pp}$, wherein $N_{ss}$ is the number of series-connected panels and $N_{pp}$ is the number of parallel-connected panels;
means for modifying the estimated PV array parameters $I_L$, $I_0$, $R_S$, $R_{SH}$, and a based on the initialized PV array size defined by $N_{ss}$, and $N_{pp}$;
means for initializing training parameters, $N_{MAX}$, being the number of training data points, $T_{MIN}$, being the minimum temperature, $T_{MAX}$, being the maximum temperature, $S_{MIN}$ being the minimum irradiation, and $S_{MAX}$ being the maximum irradiation;
means for selecting a random temperature and irradiation operating condition;
means for calculating the PV array parameter values given the selected operating condition;
means for solving a PV array modeling equation, the PV array modeling equation being characterized by the relation:

$$I_D = I_L - I_0 \left\{ \exp\left[\frac{V_{PV} + I_{PV}R_S}{a}\right] - 1 \right\} - \frac{V_{PV} + I_{PV}R_S}{R_{SH}},$$

where $I_{PV}$ and $V_{PV}$ represent the current and voltage generated from the PV panel, $I_L$ is the light generated current, $I_0$ is the diode saturation current, $R_S$ and $R_{SH}$ are the series and parallel resistance, respectively, and a is the diode modified ideality factor;
means for storing a maximum power point reference voltage $V_{MP}$ given the solution of the PV array modeling equation and corresponding to the reference voltage $V_{ref}$ at the selected operating condition; and means for storing additional $V_{MP}$ values corresponding to additional randomly selected operating conditions until a stopping criterion has been met.

3. The neuro-fuzzy control system according to claim 2, further comprising means for displaying the training data once the stopping criterion has been met.

4. The neuro-fuzzy control system according to claim 1, further comprising means for converting DC power coming from the DC-DC converter to three-phase AC power, either to supply AC loads or for integration with the grid.

5. The neuro-fuzzy control system according to claim 1, further comprising a two-level three-phase inverter coupled to the DC-DC converter for converting DC power coming from the DC-DC converter to three-phase AC power, either to supply AC loads or for integration with the grid.

6. The neuro-fuzzy control system according to claim 5, further comprising a phase locked loop (PLL) connected to the two-level three-phase inverter, the PLL having outputs $\omega$ and $\theta$ to track frequency ($\omega=2\pi f$) and phase angle $\theta$ of the grid, respectively, the PLL outputs being used for voltage ABC/DQ reference frame conversion and for current ABC/DQ reference frame conversion.

7. The neuro-fuzzy control system according to claim 6, wherein the two-level three-phase inverter further comprises a DC voltage controller maintaining a DC link voltage to its reference value.

8. The neuro-fuzzy control system according to claim 6, wherein the two-level three-phase inverter further comprises decoupled active and reactive current controllers for independent active (P) and reactive (Q) power control, respectively.

9. The neuro-fuzzy control system according to claim 2, further comprising means for optimizing the estimated PV array parameters.

10. A computer software product, comprising a non-transitory medium readable by a processor, the non-transitory medium having stored thereon a set of instructions for training an adaptive neuro-fuzzy maximum power point (MPPT) controller for a grid-connected photovoltaic (PV) system, the set of instructions including:
(a) a first sequence of instructions which, when executed by the processor, causes said processor to estimate parameters of a PV array of the PV system, the PV array parameters being $I_L$, the light generated current, $I_0$, the diode saturation current, $R_S$ and $R_{SH}$ being the series and parallel resistance, respectively, and a being the diode modified ideality factor;
(b) a second sequence of instructions which, when executed by the processor, causes said processor to initialize size of the PV array, the PV array size being characterized by variables $N_{ss}$, $N_{pp}$, wherein $N_{ss}$ is the number of series-connected panels and $N_{pp}$ is the number of parallel-connected panels;
(c) a third sequence of instructions which, when executed by the processor, causes said processor to modify the estimated PV array parameters $I_L$, $I_0$, $R_S$, $R_{SH}$, and a based on the initialized PV array size defined by $N_{ss}$, and $N_{pp}$;
(d) a fourth sequence of instructions which, when executed by the processor, causes said processor to initialize training parameters, $N_{MAX}$, being the number of training data points, $T_{MIN}$ being the minimum temperature, $T_{MAX}$ being the maximum temperature, $S_{MIN}$ being the minimum irradiation, and $S_{MAX}$ being the maximum irradiation;
(e) a fifth sequence of instructions which, when executed by the processor, causes said processor to select a random temperature and irradiation operating condition;
(f) a sixth sequence of instructions which, when executed by the processor, causes said processor to calculate the PV array parameter values given the selected operating condition;
(g) a seventh sequence of instructions which, when executed by the processor, causes said processor to solve a PV array modeling equation, the PV array modeling equation being characterized by the relation:

$$I_D = I_L - I_0 \left\{ \exp\left[\frac{V_{PV} + I_{PV}R_S}{a}\right] - 1 \right\} - \frac{V_{PV} + I_{PV}R_S}{R_{SH}},$$

where $I_{PV}$ and $V_{PV}$ represent the current and voltage generated from the PV panel, $I_L$ is the light generated current, $I_0$ is the diode saturation current, $R_S$ and $R_{SH}$ are the series and parallel resistance, respectively, and a is the diode modified ideality factor;
(h) an eighth sequence of instructions which, when executed by the processor, causes said processor to store a maximum power point reference voltage $V_{MP}$ given the solution of the PV array modeling equation and corresponding to the reference voltage $V_{ref}$ at the selected operating condition; and
(i) a ninth sequence of instructions which, when executed by the processor, causes said processor to store additional $V_{MP}$ values corresponding to additional randomly selected operating conditions until a stopping criterion has been met.

11. The computer software product according to claim 10, further comprising a tenth sequence of instructions which, when executed by the processor, causes said processor to display the training data once the stopping criterion has been met.

12. The computer software product according to claim 10, further comprising an eleventh sequence of instructions which, when executed by the processor, causes said processor to back propagate training errors using least square estimation to optimize the estimated PV array parameters.

* * * * *